US008194201B2

(12) United States Patent
Um et al.

(10) Patent No.: US 8,194,201 B2
(45) **Date of Patent: *Jun. 5, 2012**

(54) DISPLAY PANEL AND LIQUID CRYSTAL DISPLAY INCLUDING THE SAME

(75) Inventors: Yoon-Sung Um, Yongin-si (KR); Hoon Kim, Ansan-si (KR); Hye-Ran Yoo, Yongin-si (KR); Jae-Jin Lyu, Yongin-si (KR); Seung-Beom Park, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 13/221,128

(22) Filed: Aug. 30, 2011

(65) Prior Publication Data

US 2011/0309367 A1 Dec. 22, 2011

Related U.S. Application Data

(63) Continuation of application No. 12/239,928, filed on Sep. 29, 2008, now Pat. No. 8,031,287.

(30) Foreign Application Priority Data

Dec. 12, 2007 (KR) ........................ 10-2007-0129218

(51) Int. Cl.
*G02F 1/1343* (2006.01)
*G02F 1/136* (2006.01)

(52) U.S. Cl. ............................ 349/48; 349/38; 349/144

(58) Field of Classification Search ..................... 349/48
See application file for complete search history.

(56) References Cited

U.S. PATENT DOCUMENTS

| | | | | |
|---|---|---|---|---|
| 5,309,264 | A * | 5/1994 | Lien et al. | 349/143 |
| 5,657,139 | A * | 8/1997 | Hayashi | 349/40 |
| 5,822,027 | A * | 10/1998 | Shimada et al. | 349/39 |
| 6,307,611 | B1 * | 10/2001 | Kim et al. | 349/138 |
| 6,380,591 | B1 * | 4/2002 | Kawano | 257/359 |
| 6,850,302 | B2 * | 2/2005 | Song | 349/129 |

(Continued)

FOREIGN PATENT DOCUMENTS

JP 2003107503 4/2003

(Continued)

OTHER PUBLICATIONS

Non-Final Office Action of Dec. 8, 2010 in U.S. Appl. No. 12/239,928.

(Continued)

*Primary Examiner* — Michelle R Connelly
(74) *Attorney, Agent, or Firm* — H.C. Park & Associates, PLC

(57) ABSTRACT

The present invention relates to a display panel and a liquid crystal display including the same. The display panel includes a pixel electrode, which includes a first subpixel electrode, a second subpixel electrode, and a third subpixel electrode insulated from each other, a first thin film transistor connected to the first subpixel electrode, a second thin film transistor connected to the second subpixel electrode, a third thin film transistor connected to the third subpixel electrode, a gate line connected to the first, second, and third thin film transistors, a data line connected to the first, second, and third thin film transistors, and a voltage differentiating member to change voltages of the first, second, and third subpixel electrodes, the voltages of the first, second, and third subpixel electrodes being different from each other.

71 Claims, 13 Drawing Sheets

U.S. PATENT DOCUMENTS

| | | | | |
|---|---|---|---|---|
| 7,133,086 | B2 * | 11/2006 | Toyota et al. | 349/38 |
| 7,206,048 | B2 * | 4/2007 | Song | 349/129 |
| 7,843,518 | B2 * | 11/2010 | Yang et al. | 349/38 |
| 7,916,260 | B2 * | 3/2011 | Lee et al. | 349/143 |
| 8,031,287 | B2 * | 10/2011 | Um et al. | 349/48 |
| 2007/0013631 | A1 | 1/2007 | Yang | |
| 2007/0153205 | A1 | 7/2007 | Jin et al. | |
| 2008/0174537 | A1 | 7/2008 | Su et al. | |
| 2008/0211983 | A1 | 9/2008 | Tsao et al. | |
| 2009/0195488 | A1 | 8/2009 | Takeuchi et al. | |

FOREIGN PATENT DOCUMENTS

| | | |
|---|---|---|
| JP | 2005250085 | 9/2005 |
| JP | 2006171342 | 6/2006 |
| JP | 2007171711 | 7/2007 |
| JP | 2007183618 | 7/2007 |
| KR | 1020050123417 | 12/2005 |
| KR | 1020060128416 | 12/2006 |
| KR | 1020070056165 | 5/2007 |
| KR | 1020070070330 | 7/2007 |

OTHER PUBLICATIONS

Notice of Allowance of Jun. 2, 2011 in U.S. Appl. No. 12/239,928.

Corrected Notice of Allowance of Jul. 14, 2011 in U.S. Appl. No. 12/239,928.

* cited by examiner

DISPLAY PANEL AND LIQUID CRYSTAL DISPLAY INCLUDING THE SAME

CROSS-REFERENCE TO RELATED APPLICATIONS

This application is a continuation of U.S. patent application Ser. No. 12/239,928, filed on Sep. 29, 2008, and claims priority from and the benefit of Korean Patent Application No. 10-2007-0129218, filed on Dec. 12, 2007, both of which are hereby incorporated by reference for all purposes as if fully set forth herein.

BACKGROUND OF THE INVENTION

1. Field of the Invention

The present invention relates to a display panel and a liquid crystal display including the same.

2. Discussion of the Background

Liquid crystal displays are one of the most widely used types of flat panel is displays. Liquid crystal displays include two panels on which electric field generating electrodes, such as pixel electrodes and a common electrode, are disposed, and a liquid crystal layer disposed between the panels. A voltage is applied to the electric field generating electrodes to generate an electric field in the liquid crystal layer, determine the alignment of liquid crystal molecules of the liquid crystal layer, and control the polarization of input light to display an image.

Liquid crystal displays further include a switching element connected to each pixel electrode, and a plurality of signal lines, such as gate lines or data lines, to apply a voltage to a pixel electrode under the control of the switching element.

Liquid crystal displays include vertical alignment (VA) mode liquid crystal displays and patterned vertically aligned (PVA) mode liquid crystal displays. In VA mode liquid crystal displays, a longitudinal axis of a liquid crystal molecule is perpendicular to upper and lower panels in the absence of an electric field, and thus a contrast ratio is large and a reference viewing angle is wide. The reference viewing angle is defined as a viewing angle making a contrast ratio equal to 1:10 or as a limit angle for the inversion in luminance between grays.

VA mode liquid crystal displays divide one pixel into two subpixels and apply different voltages to the subpixels so that transmittance is changed and side visibility is improved to be close to front visibility.

SUMMARY OF THE INVENTION

The present invention provides a liquid crystal display that may have side visibility that is comparable to the front visibility and may provide natural images when viewed from the side.

Additional features of the invention will be set forth in the description which follows, and in part will be apparent from the description, or may be learned by practice of the invention.

The present invention discloses a display panel including a pixel electrode, which includes a first subpixel electrode, a second subpixel electrode, and a third subpixel electrode that are insulated from each other, a first thin film transistor connected to the first subpixel electrode, a second thin film transistor connected to the second subpixel electrode, a third thin film transistor connected to the third subpixel electrode, a gate line connected to the first, second, and third thin film transistors, a data line connected to the first, second, and third thin film transistors, and a voltage differentiating member to change the voltages of the first, second, and third subpixel electrodes to be different from each other.

The present invention also discloses a liquid crystal display including a gate line, a data line crossing the gate line, first and second storage electrode lines, and a pixel connected to the gate line and the data line. The pixel includes a first liquid crystal capacitor including a first subpixel electrode, a second liquid crystal capacitor including a second subpixel electrode, a third liquid crystal capacitor including the third subpixel electrode, a first storage capacitor coupled in parallel to the first liquid crystal capacitor and connected to the first storage electrode line, a second storage capacitor coupled in parallel to the second liquid crystal capacitor and connected to the first and second storage electrode lines, and a third storage capacitor coupled in parallel to the third liquid crystal capacitor and connected to the first and second storage electrode lines. The first and second storage electrode lines receive storage electrode signals with opposite phases from each other, and the charging voltages of the first, second, and third liquid crystal capacitors are different from each other.

The present invention also discloses a liquid crystal display including a gate line, a data line crossing the gate line, first and second storage electrode lines, and a pixel connected to the gate line and the data line. The pixel includes a first liquid crystal capacitor including a first subpixel electrode, a second liquid crystal capacitor including a second subpixel electrode, a third liquid crystal capacitor including a third subpixel electrode, a first storage capacitor coupled in parallel to the first liquid crystal capacitor and connected to the first storage electrode line, a second storage capacitor coupled in parallel to the second liquid crystal capacitor and connected to the first and second storage electrode lines, and a third storage capacitor coupled in parallel to the third liquid crystal capacitor and connected to the second storage electrode line, wherein the first and second storage electrode lines receive storage electrode signals with opposite phases from each other, and the charging voltages of the first, second, and third liquid crystal capacitors are different from each other.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
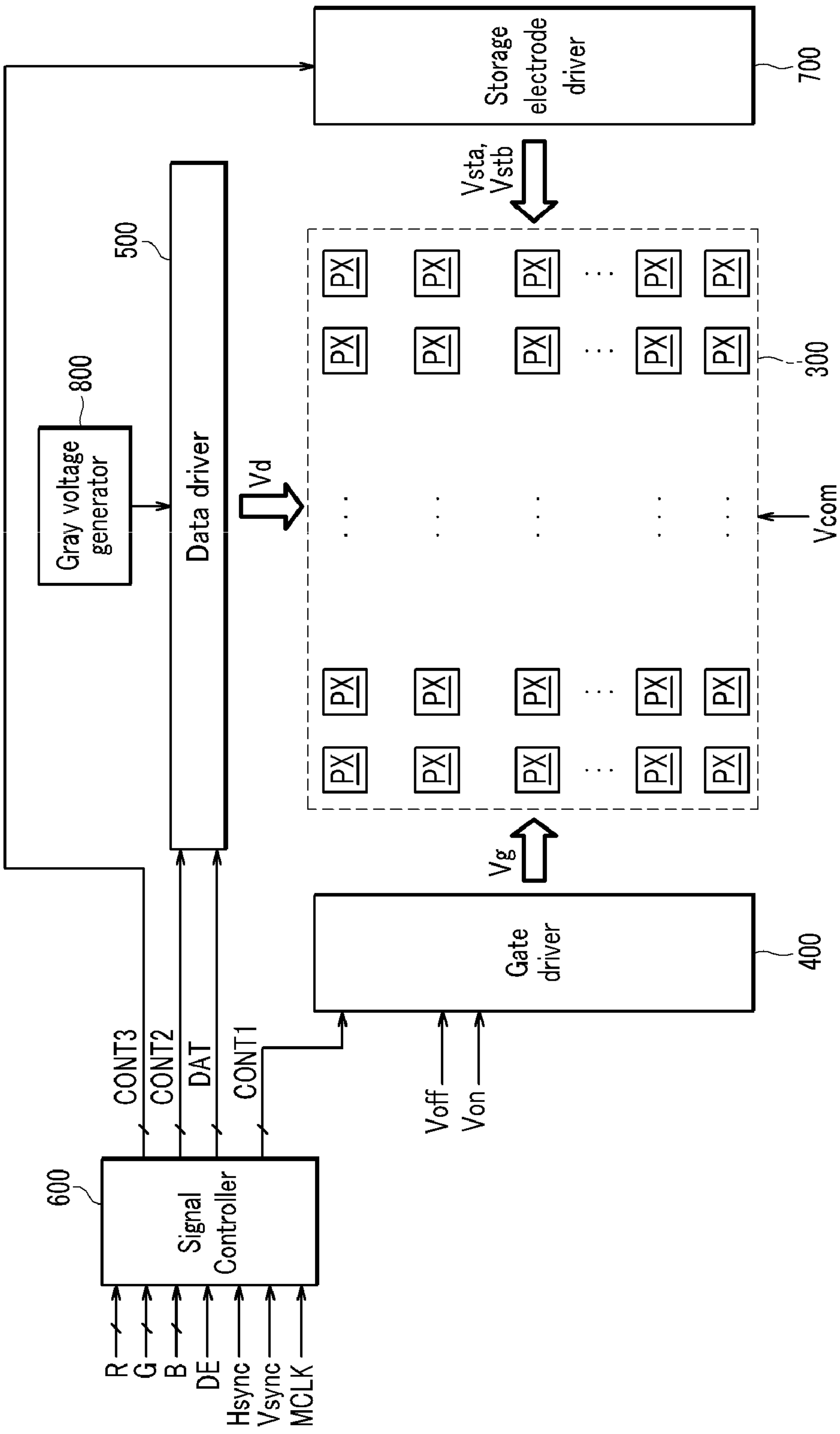
FIG. 1 is a block diagram of a liquid crystal display according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

A liquid crystal display according to an exemplary embodiment of the present invention will be described in detail below with reference to the drawings.

Figure 2:
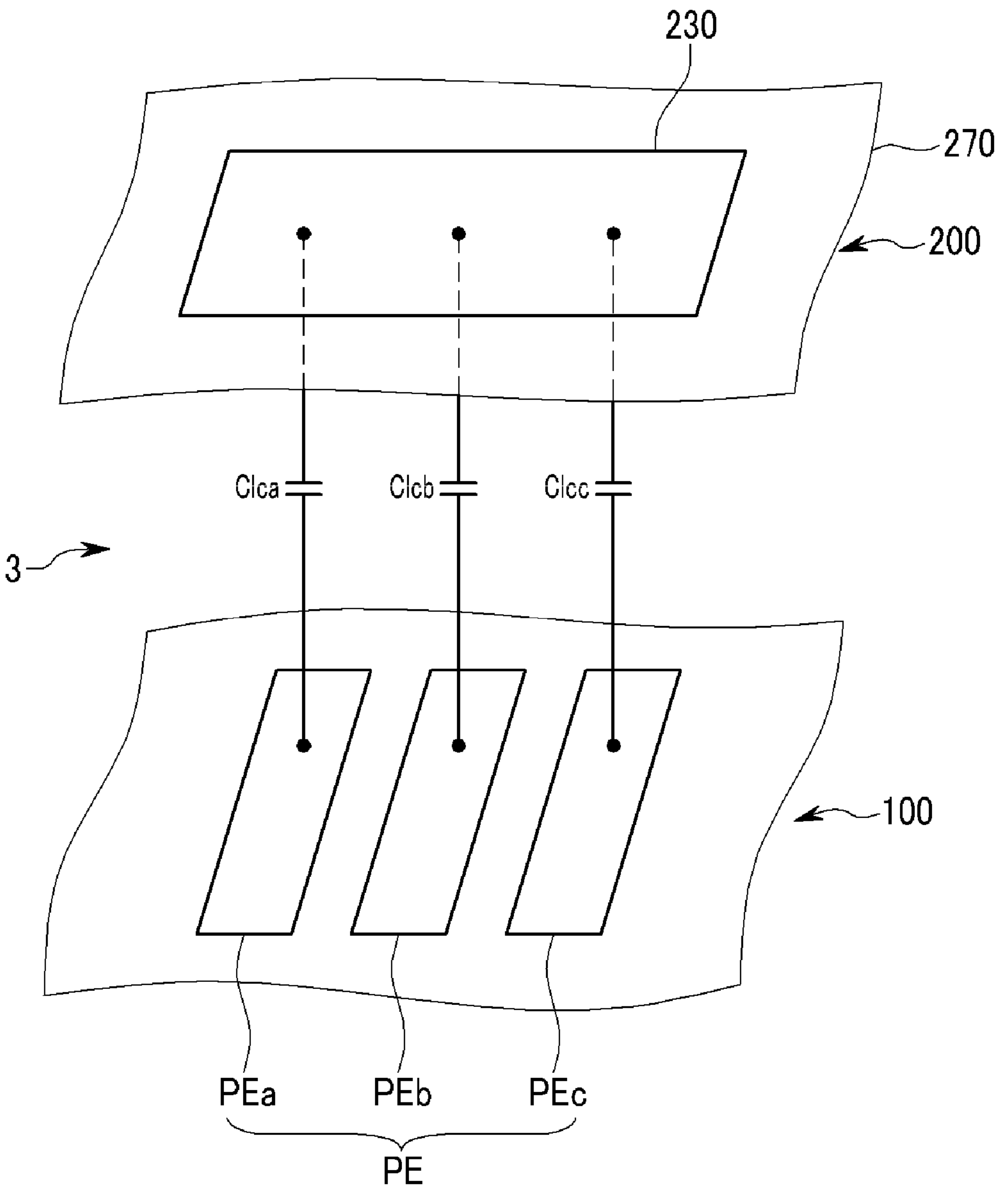
FIG. 2 is an equivalent circuit diagram of three subpixels of the liquid crystal display according to an exemplary embodiment of the present invention.
Figure 3:
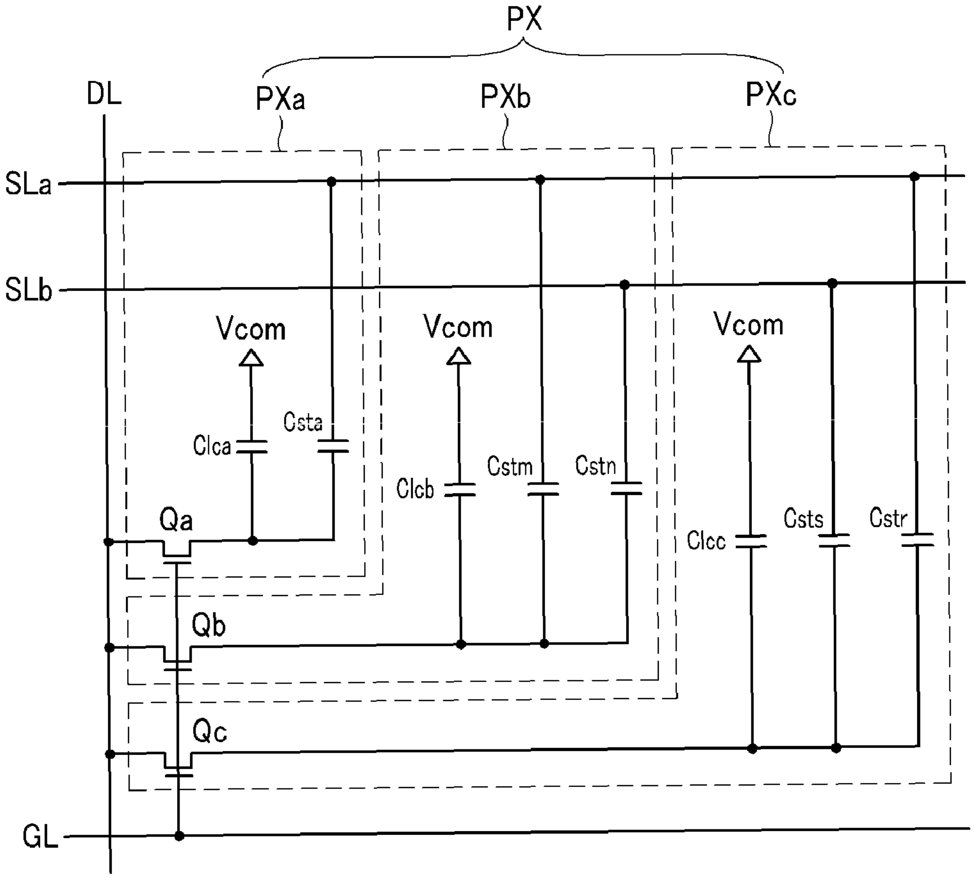
FIG. 3 is an equivalent circuit diagram of one pixel of the liquid crystal display according to an exemplary embodiment of the present invention.

FIG. 1 is a block diagram of a liquid crystal display according to an exemplary embodiment of the present invention, FIG. 2 is an equivalent circuit diagram of three subpixels of the liquid crystal display according to an exemplary embodiment of the present invention, and FIG. 3 is an equivalent circuit diagram of one pixel of the liquid crystal display according to an exemplary embodiment of the present invention.

As shown in FIG. 1, a liquid crystal display according to an exemplary embodiment of the present invention includes a liquid crystal panel assembly 300, a gate driver 400, a data driver 500, a storage electrode driver 700, a gray voltage generator 800, and a signal controller 600.

As viewed in an equivalent circuit, the liquid crystal panel assembly 300 includes a plurality of signal lines GL, DL, SLa, and SLb, and a plurality of pixels PX connected to the signal lines GL, DL, SLa, and SLb and disposed in a matrix form. In a structure shown in FIG. 2, the liquid crystal panel assembly 300 includes lower and upper panels 100 and 200 that face each other, and a liquid crystal layer 3 that is disposed between the panels 100 and 200.

The signal lines include a plurality of gate lines GL to transmit gate signals (also referred to as "scanning signals"), a plurality of data lines DL to transmit data signals, and a plurality of pairs of first and second storage electrode lines SLa and SLb, as shown in FIG. 3, to transmit storage electrode signals Vsta and Vstb, respectively. The first and the second storage electrode lines SLa and SLb are respectively applied with the first and the second storage electrode signals Vsta and Vstb having opposite phases from each other. The gate lines GL and the first and second storage electrode lines SLa and SLb extend in a row direction to be parallel to each other, and the data lines DL extend in a column direction to be parallel to each other.

The liquid crystal panel assembly according to the present exemplary embodiment includes a plurality of signal lines GL, DL, SLa, and SLb and a plurality of pixels PX connected thereto.

Each pixel PX includes three subpixels, that is, first, second, and third subpixels PXa, PXb, and PXc, and the first, second, and third subpixels PXa, PXb, and PXc include first, second, and third switching elements Qa, Qb, and Qc and the first, second, and third liquid crystal capacitors Clca, Clcb, and Clcc.

The first, second, and third switching elements Qa, Qb, and Qc are each a three terminal element, such as a thin film transistor, provided on the lower panel 100, a control terminal thereof is connected to the gate line GL, an input terminal thereof is connected to the data line DL, and an output terminal thereof is connected to the liquid crystal capacitors Clca, Clcb, and Clcc and the storage capacitors Csta, Cstb (i.e., Cstm and Cstn), and Cstc (i.e., Cstr and Csts).

The liquid crystal capacitors Clca, Clcb, and Clcc are connected to the switching elements Qa, Qb, and Qc and have two terminals of subpixel electrodes PEa, PEb, and PEc of the lower panel 100 and a common electrode 270 of the upper panel 200. The liquid crystal layer 3 between the subpixel electrodes PEa, PEb, and PEc and the common electrode 270 serves as a dielectric material. The three subpixel electrodes PEa, PEb, and PEc are spaced from each other and make up one pixel electrode PE. The common electrode 270 is disposed on the whole surface of the upper panel 200 and receives the common voltage Vcom. The liquid crystal layer 3 may have negative dielectric anisotropy. The liquid crystal molecules of the liquid crystal layer 3 are arranged such that a longitudinal axis of the liquid crystal molecules is perpendicular to the surfaces of the two panels in the absence of an electric field.

The first subpixel PXa further includes a first storage capacitor Csta connected to the first switching element Qa and a first storage electrode line SLa, and the first storage capacitor Csta is formed by overlapping the first storage electrode line SLa of the lower panel 100 and the first subpixel electrode PEa with an insulator therebetween.

The second subpixel PXb includes second and third storage capacitors Cstm and Cstn. The second storage capacitor Cstm is connected to the second switching element Qb and the first storage electrode line SLa, and is formed by overlapping the first storage electrode line SLa and the second subpixel electrode PEb with an insulator therebetween. The third storage is capacitor Cstn is connected to the second switching element Qb and the second storage electrode line SLb, and is formed by overlapping the second storage electrode line SLb and the second subpixel electrode PEb with an insulator therebetween.

The third subpixel PXc includes fourth and fifth storage capacitors Cstr and Csts. The fourth storage capacitor Cstr is formed by overlapping the first storage electrode line SLa and the third subpixel electrode PEc with an insulator therebetween, and the fifth storage capacitor Csts is formed by overlapping the second storage electrode line SLb and the third subpixel electrode PEc with an insulator therebetween.

The capacitance of the second storage capacitor Cstm is less than that of the third storage capacitor Cstn. Also, the capacitance of the fourth storage capacitor Cstr is the same as the capacitance of the fifth storage capacitor Csts. Here, the capacitances may be determined by the distances between the subpixel electrodes PXa, PXb, and PXc and the first or second storage electrode line SLa or SLb, the overlapping areas, and the dielectric ratio of the insulator. The dielectric ratio of the insulator is uniform such that the distances between the subpixel electrodes PXa, PXb, and PXc and the first or second storage electrode line SLa or SLb and the overlapping areas are mainly controlled to control the capacitances of the second, third, fourth, and fifth storage capacitors Cstm, Cstn, Cstr, and Csts.

In order to display a color in the liquid crystal display, each pixel may essentially represent any one of the primary colors (spatial division), or may represent any one of the primary colors in turn (temporal division) according to a passage of time, such that the desired color is recognized by a spatial or temporal sum of the primary colors. The primary colors may be, for example, three primary colors such as a red color, a green color, and a blue color. FIG. 2 shows an example of the spatial division in which each pixel PX includes a color filter 230 is representing one of the primary colors in an area of the upper panel 200 facing a pixel electrode 191. Alternatively, unlike in FIG. 2, the color filter 230 may be provided on or under the subpixel electrodes PEa, PEb, and PEc on the lower panel 100.

At least one polarizer (not shown) to polarize light is attached on the outer side of the liquid crystal panel assembly 300, and the polarization axis of two polarizers may be crossed. In the case of a reflective liquid crystal display, one of two polarizers 12 and 22 may be omitted. The crossed polarizers block light that is incident into the liquid crystal layer 3 in the absence of an electric field.

Returning again to FIG. 1, the gray voltage generator 800 generates two sets of gray voltages related to transmittance of the pixel PX (or sets of reference gray voltages).

The gate driver 400 is connected to the gate lines GL of the liquid crystal panel assembly 300, and applies the gate signals Vg, which are combinations of a gate-on voltage Von and a gate-off voltage Voff, to the gate lines GL.

The data driver 500 is connected to the data lines DL of the liquid crystal panel assembly 300. The data driver 500 selects the gray voltages from the gray voltage generator 800, and applies the selected gray voltages as data signals to the data lines DL. However, when the gray voltage generator 800 supplies a specific number of reference gray voltages, rather than the voltages for all gray levels, the data driver 500 divides the reference gray voltages so as to generate the gray voltages for all gray levels and selects the data signals from the divided gray voltages.

The storage electrode driver 700 is connected to the first and second storage electrode lines SLa and SLb of the liquid crystal panel assembly 300, and applies a pair of storage electrode signals Vsta and Vstb, which have opposite phases from each other, to the first and second storage electrode lines SLa and SLb, respectively. The storage electrode driver 700 may be provided as one chip along with the gate driver 400.

The signal controller 600 controls the gate driver 400, the data driver 500, the storage electrode driver 700, and the like.

Each driving device 400, 500, 600, 700, and 800 may be directly mounted on the liquid crystal panel assembly 300 in the form of at least one IC chip, or may be mounted on a flexible printed circuit film (not shown) and attached to the liquid crystal panel assembly 300 in the form of a TCP (tape carrier package). Further, the driving devices 400, 500, 600, 700, and 800 may be mounted on a separate printed circuit board (not shown). Alternatively, the driving devices 400, 500, 600, 700, and 800 may be integrated into the liquid crystal panel assembly 300. Further, the driving devices 400, 500, 600, 700, and 800 may be integrated into a single chip. In this case, at least one driving device 400, 500, 600, 700, and 800 or at least one circuit element of a driving device 400, 500, 600, 700, and 800 may be provided outside the single chip.

Now, the liquid crystal panel assembly according to an exemplary embodiment of the present invention will be described in detail with reference to FIG. 4, FIG. 5, FIG. 6, and FIG. 7.

Figure 4:
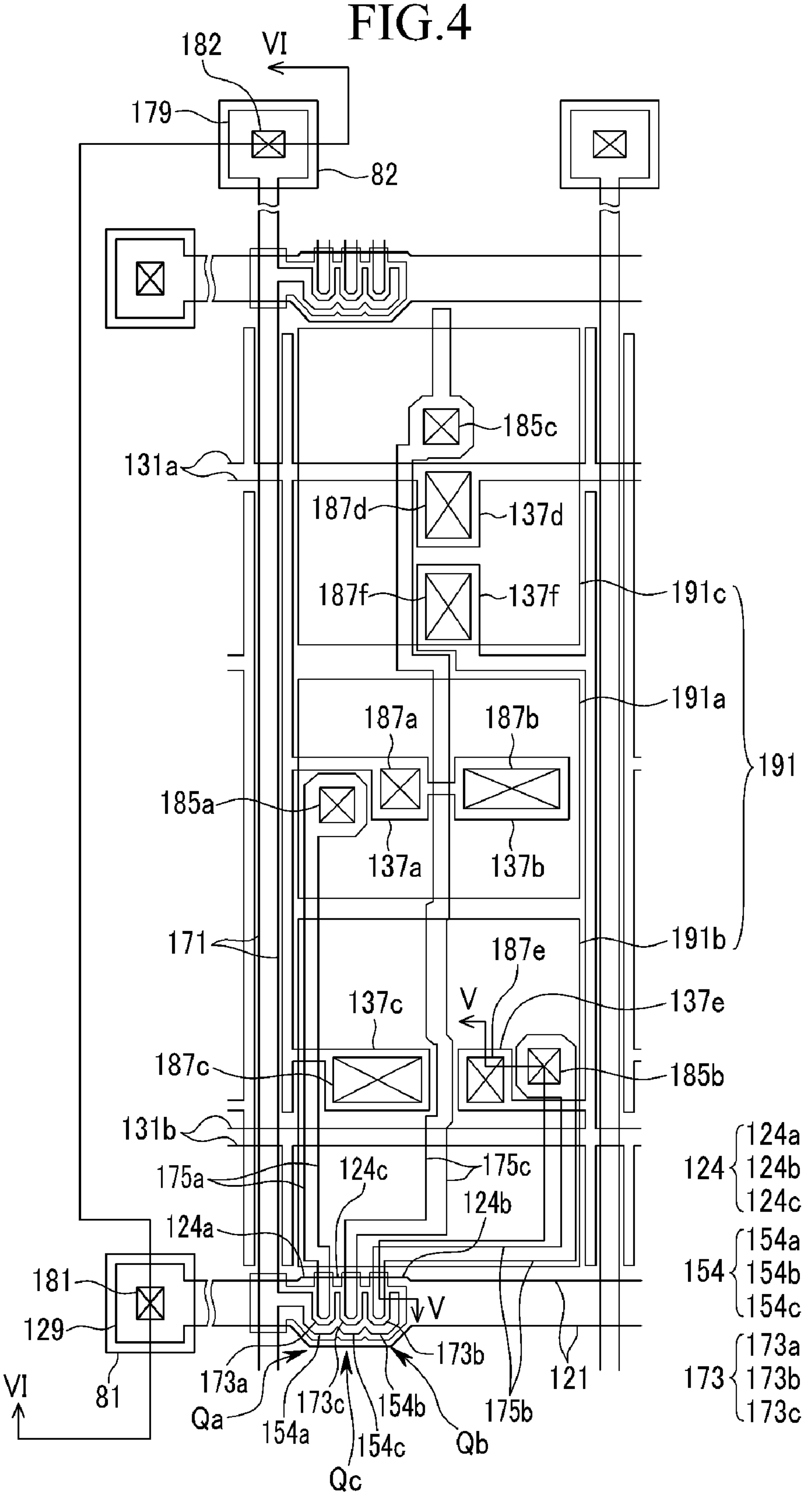
FIG. 4 is a layout view of a liquid crystal panel assembly according to an exemplary embodiment of the present invention.
Figure 5:
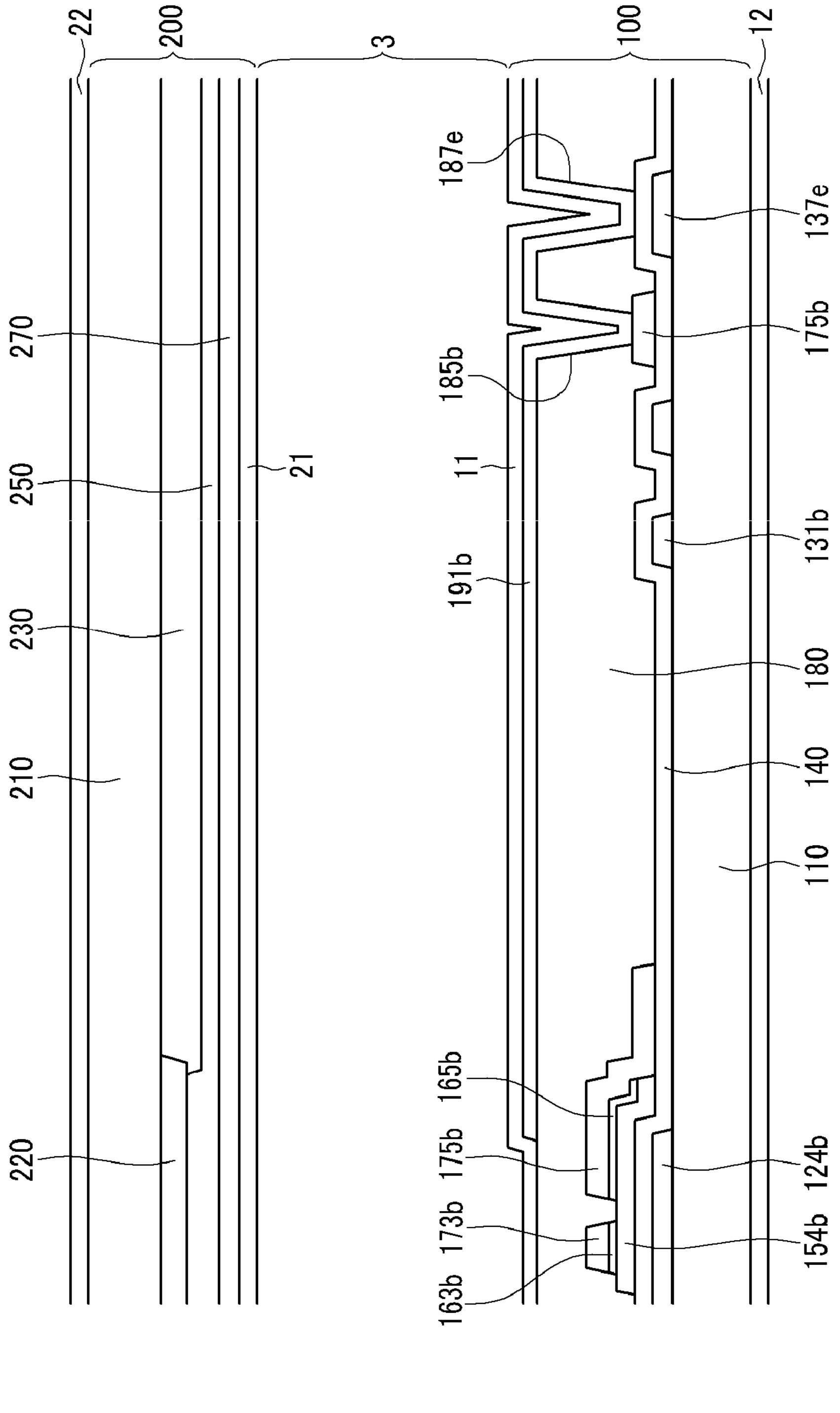
FIG. 5 and FIG. 6 are cross-sectional views of the liquid crystal panel assembly shown in FIG. 4 taken along lines V-V and VI-VI, respectively.
Figure 6:
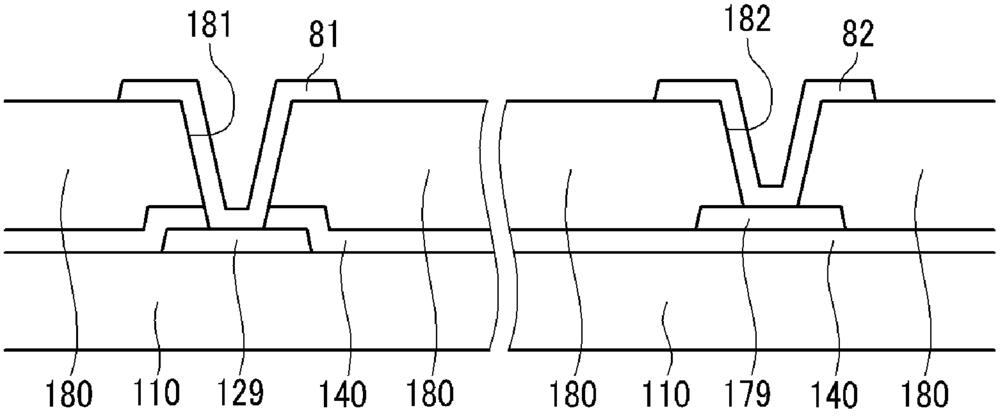
Figure 7:
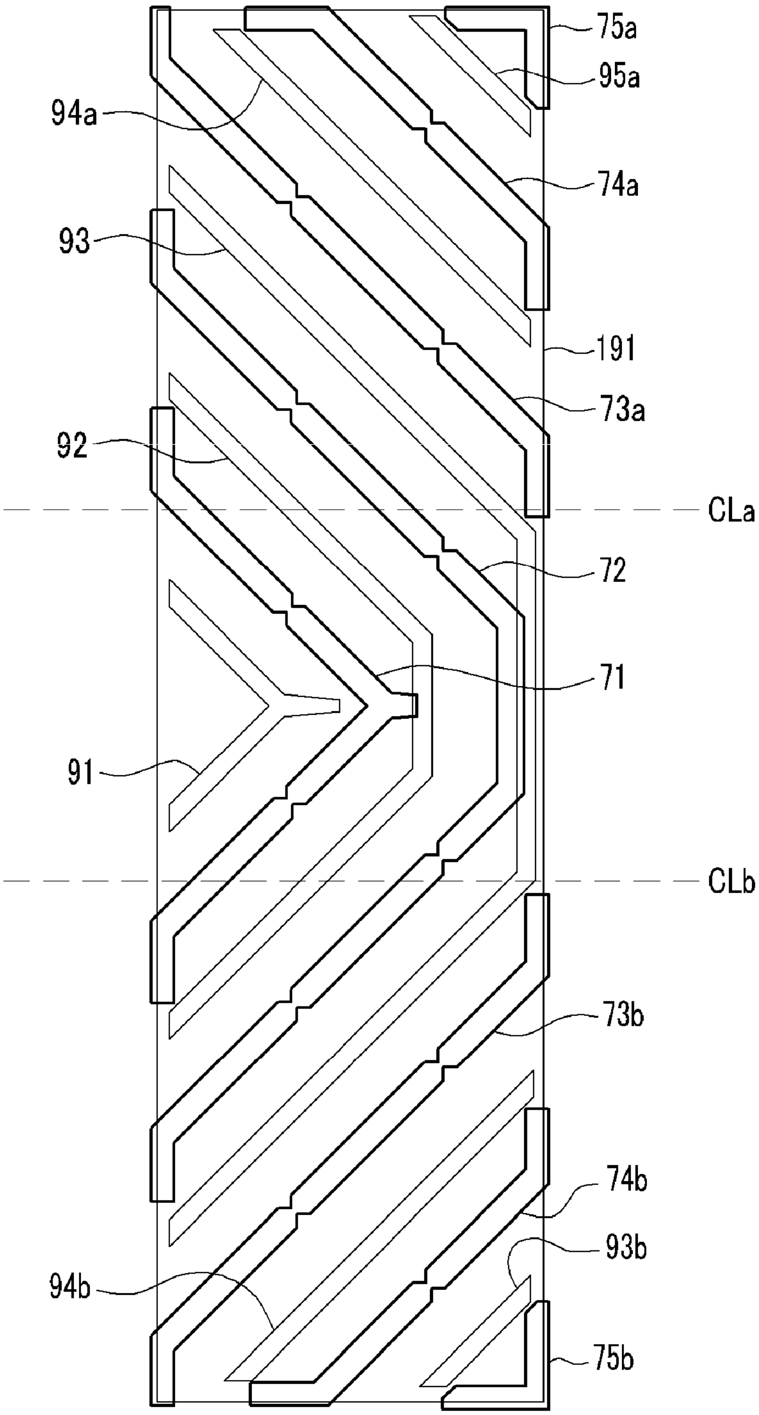
FIG. 7 is a layout view of one example of a pixel electrode applicable to the liquid crystal panel assembly shown in FIG. 4.

FIG. 4 is a layout view of a liquid crystal panel assembly according to an exemplary embodiment of the present invention, FIG. 5 and FIG. 6 are cross-sectional views of the liquid crystal panel assembly shown in FIG. 4 taken along lines V-V and VI-VI, respectively, and FIG. 7 is a layout view of one example of a pixel electrode that is applicable to the liquid crystal panel assembly shown in FIG. 4.

Referring to FIG. 4, FIG. 5, and FIG. 6, a liquid crystal display according to an exemplary embodiment of the present invention includes a lower panel 100 and an upper panel 200 facing each other, a liquid crystal layer 3 disposed between two display panels 100 and 200, and a pair of polarizers 12 and 22 attached to the outside surfaces of the display panels 100 and 200, respectively.

Firstly, the lower panel 100 is described.

A plurality of gate lines 121 and a plurality of first and second storage electrode lines 131*a* and 131*b* are disposed on an insulation substrate 110.

The gate lines 121 transmit gate signals, and extend in a horizontal direction. Each gate line 121 has a plurality of gate electrode portions 124 that protrude upward and downward, and a wide end 129 for connection with other layers and external driving circuits. Each gate electrode portion 124 includes the first, second, and third gate electrodes 124*a*, 124*b*, and 124*c*.

The first storage electrode line 131*a* receives a voltage, and includes a stem line almost parallel to the gate lines 121, a plurality of branch lines extended from the stem line, and a plurality of first, second, third, and fourth storage electrodes 137*a*, 137*b*, 137*c*, and 137*d*. The second storage electrode line 131*b* is applied with a period voltage having an opposite phase to the voltage applied to the first storage electrode line 131*a*, and includes a stem line parallel to the gate line 121, a plurality of branch lines extended from the stem line, and a plurality of fifth and sixth storage electrodes 137*e* and 137*f*. The first, second, third, fourth, fifth, and sixth storage electrodes 137*a*, 137*b*, 137*c*, 137*d*, 137*e*, and 137*f* are approximately rectangular, and the length of each side is larger than the width of the stem lines and the branch lines. Each storage electrode line 131 is disposed between two neighboring gate lines 121. However, the shape and the arrangement of the storage electrode lines 131 may vary.

A gate insulating layer 140 is disposed on the gate lines 121 and the storage is electrode lines 131*a* and 131*b*.

A plurality of semiconductor island members 154 is disposed on the gate insulating layer 140. Each semiconductor member 154 includes first, second, and third channel portions 154*a*, 154*b*, and 154*c* disposed on the first, second, and third gate electrodes 124*a*, 124*b*, and 124*c*, respectively.

A pair of first ohmic contact islands (not shown) are disposed on a first channel portion 154*a* of each semiconductor member 154, a pair of second ohmic contact islands 163*b* and

165*b* are disposed on a second channel portion 154*b*, and a pair of third ohmic contact islands (not shown) are disposed on a third channel portion 154*c*.

A plurality of data lines 171 and a plurality of first, second, and third drain electrodes 175*a*, 175*b*, and 175*c* are disposed on the first, second, and third ohmic contact islands, respectively, and the gate insulating layer 140.

The data lines 171 transmit data voltages, and substantially extend in a vertical direction to cross the gate lines 121. Each data line 171 has a plurality of source electrode portions 173 that protrude toward the gate electrode portions 124, and a wide end 179 for connection with other layers and external driving circuits. Each source electrode portion 173 has a "U" shape, and includes a plurality of first, second, and third source electrodes 173*a*, 173*b*, and 173*c* connected to each other.

The first, second, and third drain electrodes 175*a*, 175*b*, and 175*c* are spaced apart from each other and are spaced apart from the data lines 171. The first, second, and third drain electrodes 175*a*, 175*b*, and 175*c* face the first, second, and third source electrodes 173*a*, 173*b*, and 173*c* with respect to the first, second, and third gate electrodes 124*a*, 124*b*, and 124*c*.

Each drain electrode 175*a*, 175*b*, and 175*c* includes one end portion with a wide is area and another end portion with a bar shape, and the bar end portions are respectively enclosed by the source electrodes 173*a*, 173*b*, and 173*c*.

The first, second, and third gate electrodes 124*a*, 124*b*, and 124*c*, the first, second, and third source electrodes 173*a*, 173*b*, and 173*c*, and the first, second, and third drain electrodes 175*a*, 175*b*, and 175*c* make up the first, second, and third thin film transistors (TFT) Qa, Qb, and Qc as well as the first, second, and third channel portions 154*a*, 154*b*, and 154*c*, and the channels of the first, second, and third thin film transistors Qa, Qb, and Qc are disposed in the first, second, and third channel portions 154*a*, 154*b*, and 154*c* between the first, second, and third source electrodes 173*a*, 173*b*, and 173*c* and the first, second, and third drain electrodes 175*a*, 175*b*, and 175*c*.

A passivation layer 180 is disposed on the data lines 171, the drain electrodes 175*a*, 175*b*, and 175*c*, and the exposed semiconductor members 154.

The passivation layer 180 has a plurality of contact holes 182, 185*a*, 185*b*, and 185*c* respectively exposing the wide end portions 179 of the data lines 171 and the first, second, and third drain electrodes 175*a*, 175*b*, and 175*c*. The passivation layer 180 and the gate insulating layer 140 have a plurality of contact holes 181 respectively exposing the wide end portions 129 of the gate lines 121. Also, the passivation layer 180 has first, second, third, fourth, fifth, and sixth openings 187*a*, 187*b*, 187*c*, 187*d*, 187*e*, and 187*f* disposed on the first, second, third, fourth, fifth, and sixth storage electrodes 137*a*, 137*b*, 137*c*, 137*d*, 137*e*, and 137*f*, respectively.

A plurality of pixel electrodes 191 and a plurality of contact assistants 81 and 82 are disposed on the passivation layer 180.

Each pixel electrode 191 includes first, second, and third subpixel electrodes 191*a*, 191*b*, and 191*c*. Each subpixel electrode 191*a*, 191*b*, and 191*c* is approximately rectangular and they are arranged in a vertical direction. However, the shape and the arrangement thereof may vary.

The area of the first subpixel electrode 191*a* may be in the range of 10% to 50% of the entire area of the pixel electrode 191, the area of the second subpixel electrode 191*b* may be in the range of 20% to 50% of the entire area of the pixel electrode 191, and the area of the third subpixel electrode 191*c* may be in the range of 40% to 70% of the entire area of the pixel electrode 191.

The first subpixel electrode 191*a* is connected to the first drain electrode 175*a* through the contact hole 185*a*, the second subpixel electrode 191*b* is connected to the second drain electrode 175*b* through the contact hole 185*b*, and the third subpixel electrode 191*c* is connected to the third drain electrode 175*c* through the contact hole 185*c*. That is, the first, second, and third subpixel electrodes 191*a*, 191*b*, and 191*c* are spaced from each other.

The first, second, an dthird subpixel electrodes 191*a*, 191*b*, and 191*c* and the common electrode 270 of the upper panel 200 form the first, second, and third liquid crystal capacitors Clca, Clcb, and Clcc along with the liquid crystal layer 3 therebetween such that they maintain the applied voltages after the thin film transistors Qa, Qb, and Qc are turned off.

The first subpixel electrode 191*a* overlaps the first storage electrode line 131*a* including the first and second storage electrodes 137*a* and 137*b*. Here, the passivation layer 180 has the first and second openings 187*a* and 187*b* on the portions where the first subpixel electrode 191*a* and the first and second storage electrodes 137*a* and 137*b* overlap each other such that the gate insulating layer 140 only exists between the pixel electrode 191 and the first and second storage electrodes 137*a* and 137*b* in the corresponding portions, and the distance between is the pixel electrode 191 and the first and second storage electrodes 137*a* and 137*b* may be decreased to increase the capacitance of the storage capacitor Csta formed by the first subpixel electrode 191*a* and the first and second storage electrodes 137*a* and 137*b*.

The second subpixel electrode 191*b* overlaps the first storage electrode line 131*a* including the third storage electrode 137*c* and the second storage electrode line 131*b* including the fifth storage electrode 137*e*. Here, the overlapping area between the second subpixel electrode 191*b* and the first storage electrode line 131*a* is greater than the overlapping area between the second subpixel electrode 191*b* and the second storage electrode line 131*b*. The passivation layer 180 has the third and fifth openings 187*c* and 187*e* disposed on the overlapping area between the second subpixel electrode 191*b* and the third and fifth storage electrodes 137*c* and 137*e* such that only the gate insulating layer 140 remains between the pixel electrode 191 and the third and fifth storage electrodes 137*c* and 137*e* in the corresponding portion. The capacitance of the storage capacitor Cstm formed by the first storage electrode line 131*a* and the second subpixel electrode 191*b* may be larger than that of the storage capacitor Cstn of the second storage electrode line 131*b* and the second subpixel electrode 191*b* in consideration of the overlapping area and the area of the openings 187*c* and 187*e*.

The third subpixel electrode 191*c* overlaps with the first storage electrode line 131*a*, which includes the fourth storage electrode 137*d*, and the second storage electrode line 131*b*, which includes the sixth storage electrode 137*f*. Here, the overlapping area between the third subpixel electrode 191*c* and the first storage electrode line 131*a* is substantially the same as the overlapping area between the third subpixel electrode 191*c* and the second storage electrode line 131*b*. Also, the passivation layer 180 includes the fourth and sixth openings 187*d* and 187*f* in the overlapping area between the third subpixel electrode 191*c* and the fourth and sixth is storage electrodes 137*d* and 137*f*, such that only the gate insulating layer 140 remains between the third subpixel electrode 191*c* and the fourth and sixth storage electrodes 137*d* and 137*f* in the corresponding portion. The capacitance of the storage capacitor Cstr formed by the first storage electrode line 131*a* and the third subpixel electrode 191*c* is determined to be the same as that of the storage capacitor Csts formed by the second storage electrode line 131*b* and the third subpixel electrode 191*c* in consideration of the overlapping area and the area of the openings 187*c* and 187*e*.

The first and second storage electrode lines 131*a* and 131*b* overlap the pixel electrode 191, and include a plurality of branch lines parallel to the data lines 171.

On the other hand, the first drain electrode 175 extends to cross the central portion of the pixel electrode 191 in the vertical direction. The first opening 187*a* and the first contact hole 185*a* are on an opposite side of the second drain electrode 175*b* than the second opening 187*b*, and the third opening 187*c* is on an opposite side of the second drain electrode 175*b* than the fifth opening 187*e* and the fifth contact hole 185*e*. The fourth opening 187*d*, the sixth opening 187*f*, and the third contact hole 185*c* are disposed in a line with the second drain electrode 175*b*.

On the other hand, as shown in FIG. 7, the pixel electrode 191 may include a plurality of cutouts 91, 92, 93, 94*a*, 94*b*, 95*a*, and 95*b*. Here, the pixel electrode 191 may include the cut lines CLa and CLb indicated in FIG. 7, which divide it into the first, second, and third subpixel electrodes 191*a*, 191*b*, and 191*c*.

The contact assistants 81 and 82 are respectively connected to the end portions 129 and 179 of the gate lines 121 and the data lines 171 through the contact holes 181 and 182. The contact assistants 81 and 82 enhance the adhesion between the end portions 129 and 179 of is the gate lines 121 and the data lines 171, and to an external device, and protect them.

Now, the upper panel 200 will be described.

A light blocking member 220 is disposed on an insulation substrate 210 that may be made of transparent glass or plastic. The light blocking member 220 may be referred as a black matrix, and it blocks light leakage.

A plurality of color filters 230 is disposed on the substrate 210. The color filters 230 may be mainly disposed in the regions enclosed by the light blocking member 220, and may extend according to the column of the pixel electrodes 191 in the vertical direction. Each color filter 230 may display one of the primary colors such as red, green, or blue.

An overcoat 250 is disposed on the color filters 230 and the light blocking member 220.

A common electrode 270 is disposed on the overcoat 250. As shown in FIG. 7, the common electrode 270 may have a plurality of cutouts 71, 72, 73*a*, 73*b*, 74*a*, 74*b*, 75*a*, and 75*b*.

Alignment layers 11 and 21 are disposed at inside surfaces of the display panels 100 and 200, respectively, and they may be vertical alignment layers.

The liquid crystal layer 3 may have negative dielectric anisotropy. The liquid crystal molecules of the liquid crystal layer 3 are arranged such that a longitudinal axis of the liquid crystal molecules is perpendicular to the surfaces of the two panels 100 and 200 in the absence of an electric field.

Next, the operation of the liquid crystal display will be described in detail with reference to FIG. 8, FIG. 1, FIG. 2, and FIG. 3.

Figure 8:
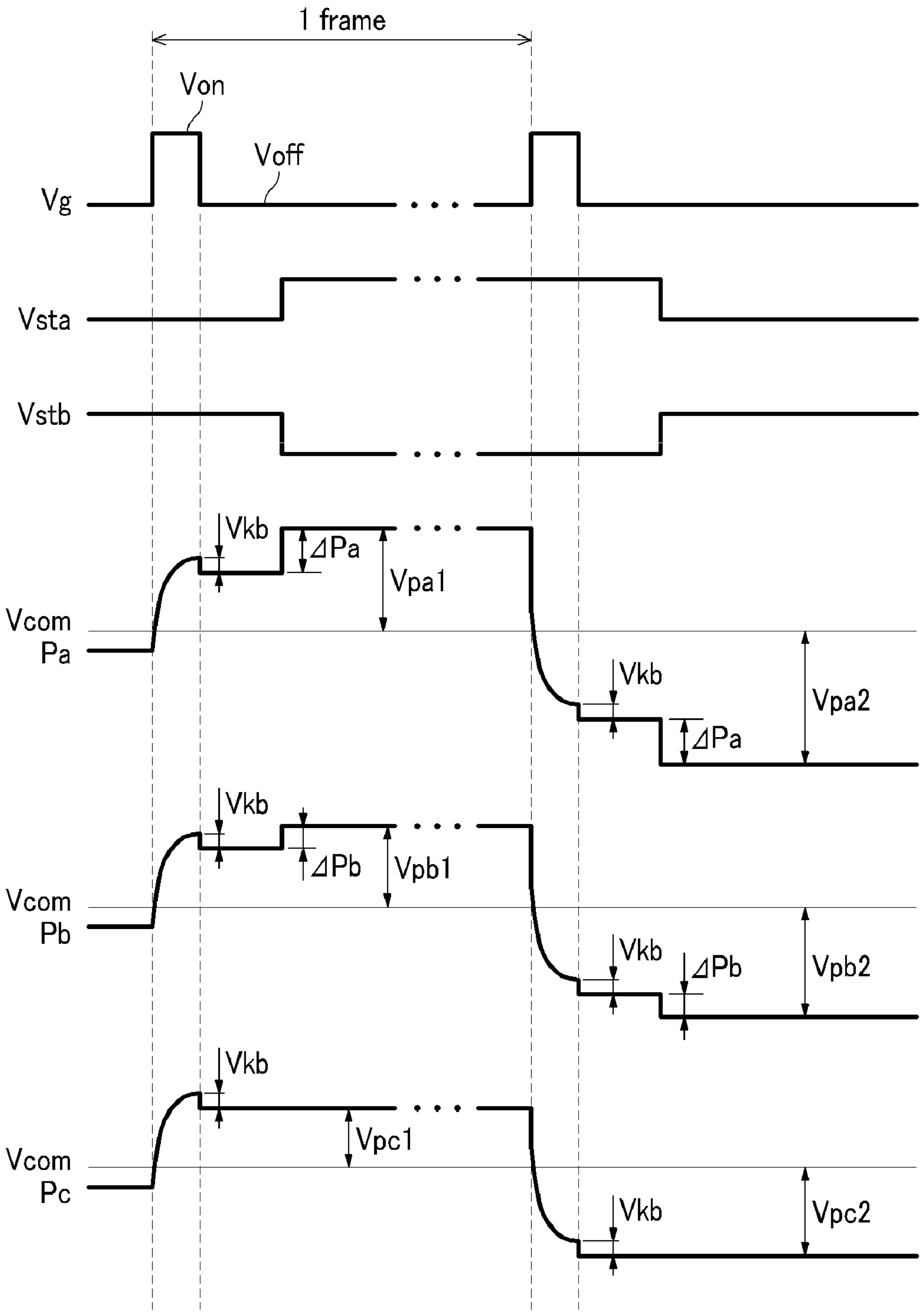
FIG. 8 is a waveform diagram showing the driving voltage of the liquid crystal display according to an exemplary embodiment of the present invention.

FIG. 8 is a waveform diagram showing the driving voltage of the liquid crystal is display according to an exemplary embodiment of the present invention.

Firstly, referring to FIG. 1, the signal controller 600 receives input image signals R, G, and B and input control signals to control display of the input image signals R, G, and B from an external graphics controller (not shown). The input image signals R, G, and B contain luminance information of each pixel PX. The luminance has a specific number of grays, such as 1024 (=$2^{10}$), 256 (=$2^8$), or 64 (=$2^6$). Examples of the input control signals include a vertical synchronization signal Vsync, a horizontal synchronization signal Hsync, a main clock signal MCLK, and a data enable signal DE.

The signal controller 600 processes the input image signals R, G, and B according to an operating condition of the liquid crystal panel assembly 300 based on the input image signals R, G, and B and the input control signals to generate a gate control signal CONT1, a data control signal CONT2, a storage electrode control signal CONT3, and the like, and thereafter sends the generated gate control signal CONT1 to the gate driver 400, the generated data control signal CONT2 and the processed image signal DAT to the data driver 500, and the storage electrode control signal CONT3 to the storage electrode driver 700. The output image signal DAT is as a digital signal and has the specific number of values (or grays).

The data driver 500 receives digital image signals DAT for a row of pixels PX according to the data control signal CONT2 transmitted from the signal controller 600, and selects a grayscale voltage corresponding to each digital image signal DAT to convert the digital image signals DAT into analog data signals. Thereafter, the data driver 500 applies the converted analog data signals to corresponding data lines DL.

The gate driver 400 applies a gate-on voltage Von to the gate lines GL according to the gate control signal CONT1 transmitted from the signal controller 600 to turn on the is switching elements Qa, Qb, and Qc connected to the gate lines GL. Then, the data voltage Vd applied to the data lines DL is applied to corresponding the subpixels PX1, PX2, and PX3 through the turned-on switching elements Qa, Qb, and Qc.

Here, the first, second, and third subpixel electrodes 191*a*, 191*b*, and 191*c* that make up one pixel electrode 191 are respectively connected to the switching elements Qa, Qb, and Qc, but the switching elements Qa, Qb, and Qc are all connected to the same gate line GL and the data line DL. Accordingly, the first, second, and third subpixel electrodes 191*a*, 191*b*, and 191*c* receive the same data voltage Vd through the same data line DL at the same time.

Accordingly, as shown in FIG. 8, each subpixel electrode voltage Pa, Pb, and Pc is increased to almost the same some level. Next, if the switching elements Qa, Qb, and Qc are turned-off, the first, second, and third subpixel electrodes 191*a*, 191*b*, and 191*c* are floated. Here, the gate voltage Vg changes from the gate-on voltage Von to the gate-off voltage Voff such that each of the subpixel electrode voltages Pa, Pb, and Pc are decreased by a kick-back voltage Vkb.

Thereafter, the voltages of the first and second storage electrode lines SLa and SLb are changed such that the voltages of the first, second, and third subpixel electrodes 191*a*, 191*b*, and 191*c* change and become different from each other.

In detail, the first subpixel electrode voltage Pa is increased by the value ΔPa according to the change of the first storage electrode signal Vsta.

The second subpixel electrode voltage Pb is increased by the value APb, which is somewhat offset, rather than the variation of the first storage electrode signal Vsta.

The influences of the first storage electrode signal Vsta and the second storage electrode signal Vstb are offset from each other such the third subpixel electrode voltage Pc is is maintained.

Accordingly, in relation to the common voltage Vcom, the voltage of first subpixel electrode 191*a* becomes Vpa1, the voltage of the second subpixel electrode 191*b* becomes Vpb1, the voltage of the third subpixel electrode 191*c* becomes Vpc1, and the order of the magnitude thereof is Vpa1>Vpb1>Vpc1.

These subpixel electrode voltages Vpa1, Vpb1, and Vpc1 are maintained during one frame.

In this way, if the potential difference is generated between both terminals of the first, second, and third liquid crystal capacitors Clca, Clcb, and Clcc, a primary electric field that is perpendicular to the surfaces of the display panels 100 and 200 is generated in the liquid crystal layer 3. Hereafter, the pixel electrode 191 and the common electrode 270 are referred to as "field generating electrodes". The liquid crystal molecules of the liquid crystal layer 3 are arranged in response to the electric field such the long axis thereof are vertically declined in the direction of the electric field, and the change degree of the polarization of the light that is incident to the liquid crystal layer 3 is changed according to the declination degree of the liquid crystal molecules. This change of the polarization appears as a change of the transmittance of the polarizer, thereby displaying images of the liquid crystal display.

The declination angle of the liquid crystal molecules is changed according to the intensity of the electric field, and because the voltages of the three liquid crystal capacitors Clca, Clcb, and Clcb are different, the declination angles of the liquid crystal molecules of the three liquid crystal capacitors Clca, Clcb, are Clcb are different such that the luminance of the three subpixels are different. Accordingly, if the voltages of the three liquid crystal capacitors Clca, Clcb, and Clcb are appropriately controlled, the images shown at the side of the display may is approximate the image shown in the front, that is to say, the gamma curve of the side may be approximately close to the gamma curve of the front to thereby improve the side visibility.

By repeating this procedure every horizontal period (also referred to as a "1H" period and equal to one period of the horizontal synchronization signal Hsync and the data enable signal DE), the data voltages Vd are applied to all pixels PX to display images for a frame.

When the next frame starts after one frame finishes, the inversion control signal RVS applied to the data driver 500 is controlled such that the polarity of the data signals is reversed (which is referred to as "frame inversion").

That is to say, referring to FIG. 8, the polarity of the voltage applied to each subpixel electrode is reversed in the next frame, and the procedure of the previous frame is repeated, the voltage of the first subpixel electrode 191*a* becomes Vpa2, the voltage of the second subpixel electrode 191*b* becomes Vpb2, the voltage of the third subpixel electrode 191*c* becomes Vpc2, and the order of the magnitude thereof is Vpa2>Vpb2>Vpc2.

On the other hand, the inversion control signal RVS may also be controlled such that the polarity of the data signals flowing in a data line are periodically reversed during one frame (for example row inversion and dot inversion), or the polarity of the data signals in one packet is reversed (for example column inversion and dot inversion).

Now, a liquid crystal panel assembly according to another exemplary embodiment of the present invention will be described in detail with reference to FIG. 9 and FIG. 10.

Figure 9:
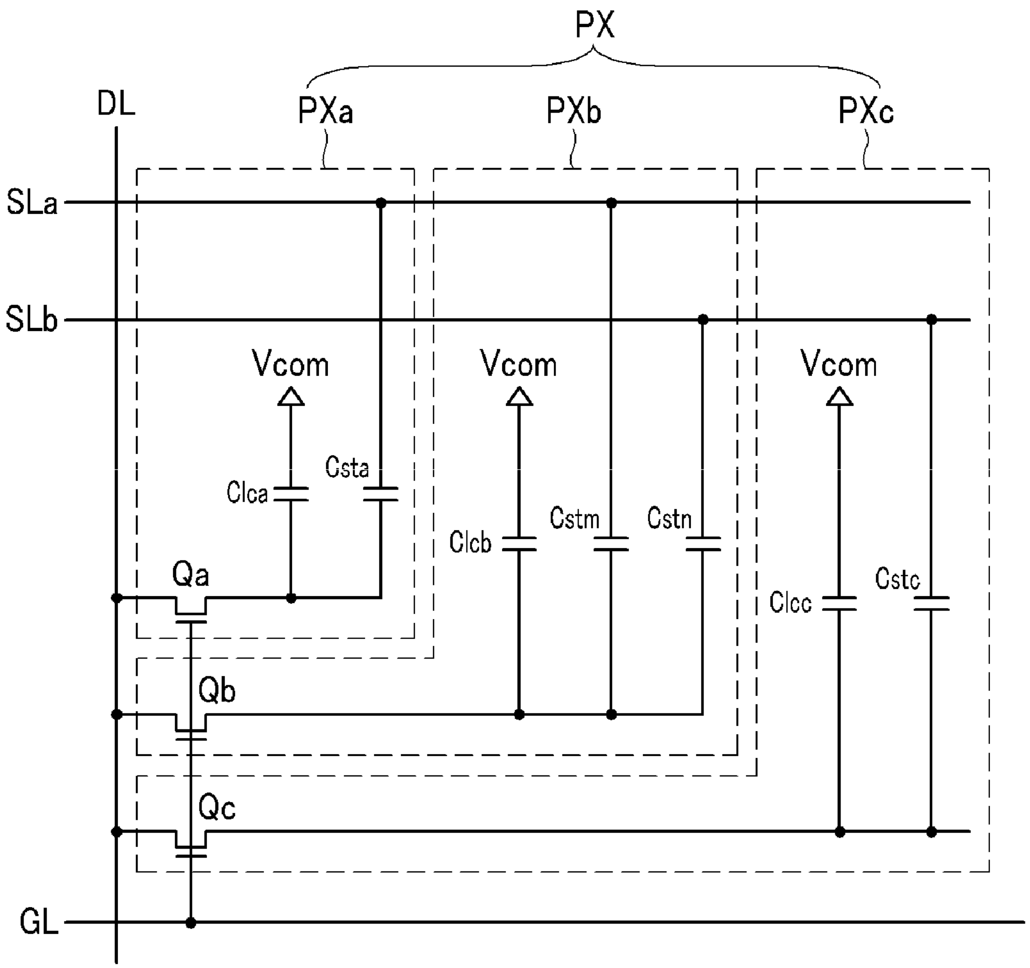
FIG. 9 is an equivalent circuit diagram of one pixel of a liquid crystal panel assembly according to another exemplary embodiment of the present invention.

FIG. 9 is an equivalent circuit diagram of one pixel of a liquid crystal panel assembly according to another exemplary embodiment of the present invention.

Referring to FIG. 9, like FIG. 3, each pixel PX includes the first, second, and third subpixels PXa, PXb, and PXc, each subpixel PXa, PXb, and PXc includes the first, second, and third switching elements Qa, Qb, and Qc respectively connected to the corresponding gate line GL and the corresponding data line DL and the first, second, and third liquid crystal capacitors Clca, Clcb, and Clcc connected thereto. The first subpixel PXa includes the first switching element Qa and the first storage capacitor Csta connected to the first storage electrode line SLa. The second subpixel PXb includes the second switching element Qb and the second and third storage capacitors Cstm and Cstn connected to the first and second storage electrode lines SLa and SLb, respectively.

However, different from FIG. 3, the liquid crystal panel assembly of FIG. 9 includes the third subpixel PXc having the fourth storage capacitor Cstc connected to the third switching element Qc and the second storage electrode line SLb.

Next, the detailed structure of the liquid crystal panel assembly of FIG. 9 will be described with reference to FIG. 10.

Figure 10:
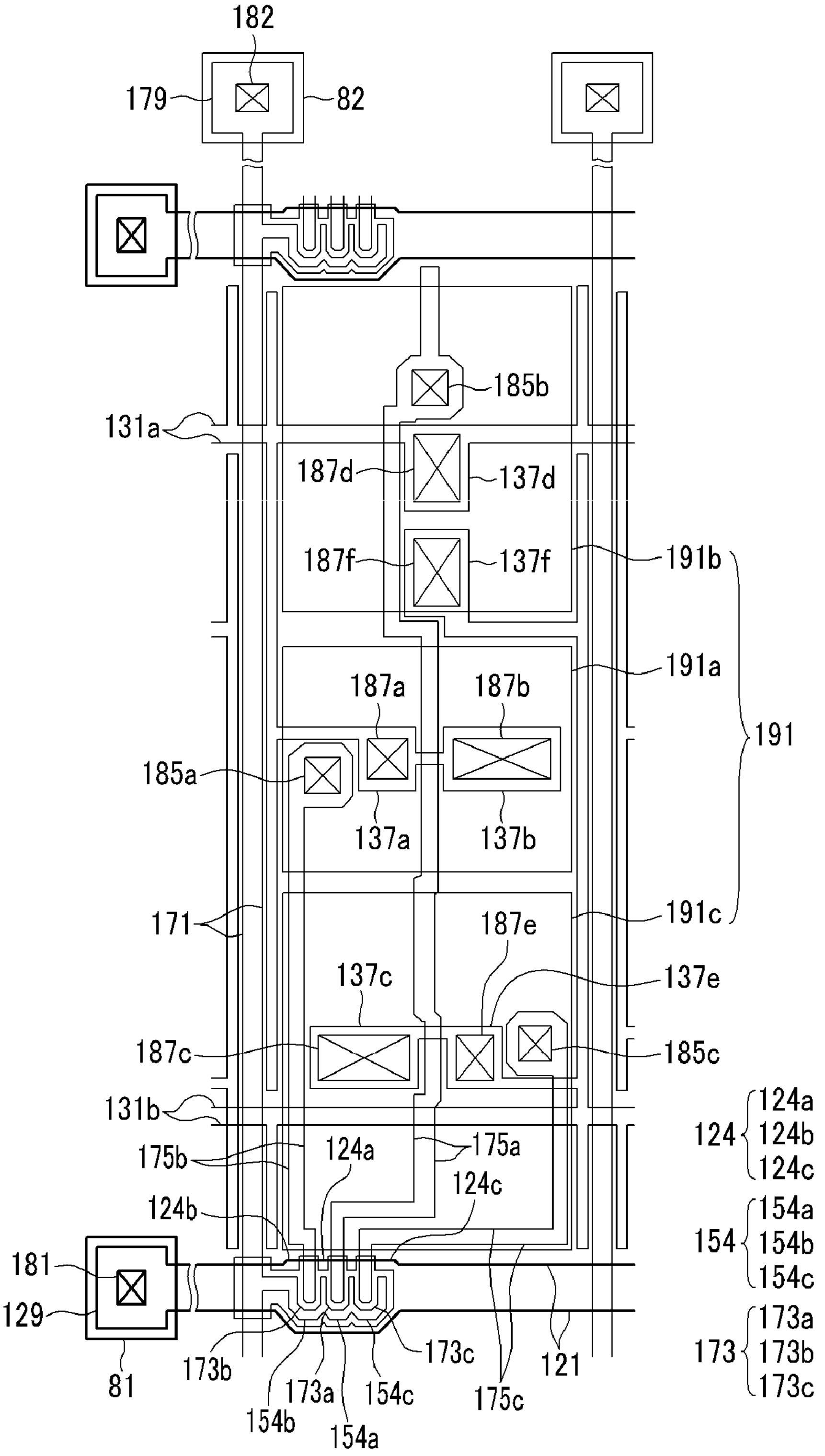
FIG. 10 is a layout view of the liquid crystal panel assembly according to another exemplary embodiment of the present invention.

FIG. 10 is a layout view of a liquid crystal panel assembly according to another exemplary embodiment of the present invention.

Like the liquid crystal panel assembly of FIG. 4, FIG. 5, and FIG. 6, a liquid crystal panel assembly of FIG. 10 includes a lower panel (not shown) and an upper panel (not shown) facing each other, a liquid crystal layer (not shown) disposed between the two panels, and a pair of polarizers (not shown) attached to the outside surfaces of the display panels.

The layered structure of the liquid crystal panel assembly according to the present exemplary embodiment is almost the same as the layered structure of the liquid crystal panel assembly shown in FIG. 5 and FIG. 6.

In the lower panel, a plurality of gate lines 121 and a plurality of first and second is storage electrode lines 131*a* and 131*b* are disposed on an insulation substrate (not shown). Each gate line 121 includes first, second, and third gate electrodes 124*a*, 124*b*, and 124*c* and an end portion 129. The storage electrode lines 131*a* and 131*b* include a plurality of storage electrodes 137*a*, 137*b*, 137*c*, 137*d*, 137*e*, and 137*f*. A gate insulating layer (not shown) is disposed on the gate lines 121 and the storage electrode lines 131*a* and 131*b*. A plurality of semiconductor islands 154*a*, 154*b*, and 154*c* are disposed on the gate insulating layer, and a plurality of ohmic contact islands (not shown) are disposed thereon. A data conductor including a plurality of data lines 171 and a plurality of the first, second, and third drain electrodes 175*a*, 175*b*, and 175 are disposed on the ohmic contacts. Each data line 171 includes a plurality of first, second, and third source electrodes 173*a*, 173*b*, and 173*c* and an end portion 179. A passivation layer (not shown) is disposed on the data conductors 171, 175*a*, 175*b*, and 175*c* and the exposed semiconductors 154*a*, 154*b*, and 154*c*, and the passivation layer and the gate insulating layer have a plurality of contact holes 181, 182, 185*a*, 185*b*, and 185*c* and a plurality of openings 187*a*, 187*b*, 187*c*, 187*d*, 187*e*, and 187*f*. A plurality of pixel electrodes 191 including the first, second, and third subpixel electrodes 191*a*, 191*b*, and 191*c* and a plurality of contact assistants 81 and 82 are disposed on the passivation layer. An alignment layer (not shown) is disposed on the pixel electrode 191, the contact assistants 81 and 82, and the passivation layer.

In the upper panel, a light blocking member (not shown), a plurality of color filters (not shown), an overcoat (not shown), a common electrode (not shown), and an alignment layer (not shown) are disposed on an insulation substrate (not shown).

However, in the liquid crystal panel assembly according to the present exemplary embodiment, when comparing with the liquid crystal panel assembly shown in FIG. 4, FIG. 5, and FIG. 6, the third storage electrode 137*c* is connected to the second storage electrode line 131*b*, not the first storage electrode line 131*a*. Accordingly, the second storage electrode voltage Vstb is applied to the third storage electrode 137*c*.

The first subpixel electrode 191*a* overlaps with the first storage electrode line 131*a*, which includes the first and second storage electrodes 137*a* and 137*b*.

The second subpixel electrode 191*b* overlaps with the first storage electrode line 131*a*, which includes the fourth storage electrode 137*d*, and the second storage electrode line 131*b*, which includes the sixth storage electrode 137*f*. Here, the overlapping area between the second subpixel electrode 191*b* and the first storage electrode line 131*a* is substantially the same as the overlapping area between the second subpixel electrode 191*b* and the second storage electrode line 131*b*. The capacitance of the storage capacitor Cstm, which is formed by the first storage electrode line 131*a* and the second subpixel electrode 191*b*, may be the same as that of the storage capacitor Cstn, which is formed by the second storage electrode line 131 and the second subpixel electrode 191*b*, in consideration of the overlapping area and the area of the openings 187*d* and 187*f*.

The third subpixel electrode 191*c* is disposed below the first subpixel electrode 191*a*, and overlaps with the second storage electrode line 131*b*, which includes the third and fifth storage electrodes 137*c* and 137*e*.

Now, the driving of the liquid crystal display including the liquid crystal panel assembly shown in FIG. 9 and FIG. 10 will be described with reference to FIG. 11.

Figure 11:
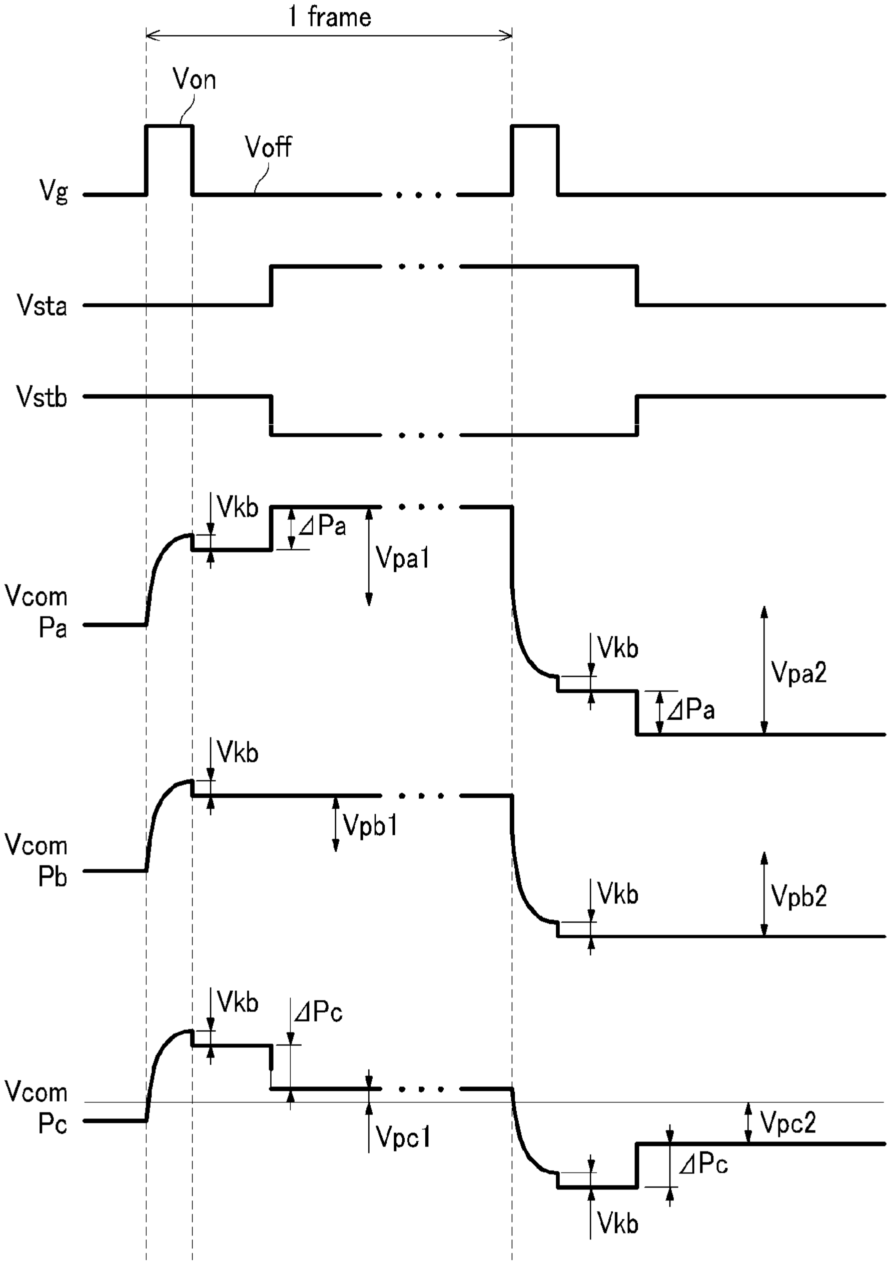
FIG. 11 is a waveform diagram showing the driving voltage of the liquid crystal display according to another exemplary embodiment of the present invention.

Referring to FIG. 11, the first, second, and third subpixel electrodes 191*a*, 191*b*, and 191*c* that make up one pixel electrode 191 respectively receive the same data voltage Vd through the same data line DL at the same time through the respective switching elements Qa, Qb, and Qc.

Accordingly, the voltage Pa, Pb, and Pc of each subpixel electrode 191*a*, 191*b*, and 191*c* is increased by the same degree. Next, if the switching elements Qa, Qb, and Qc are turned off, the first, second, and third subpixel electrodes 191*a*, 191*b*, and 191*c* are floated. Here, the gate voltage Vg is changed from the gate-on voltage Von to the gate-off voltage Voff such that each subpixel electrode voltage Pa, Pb, and Pc drops by the kick-back voltage Vkb. However, the first, second, and third subpixel electrodes 191*a*, 191*b*, and 191*c* form the capacitors Csta, Cstb, and Cstc along with the first and second storage electrode lines SLa and SLb such that the voltages of the first, second, and third subpixel electrodes 191*a*, 191*b*, and 191*c* are changed according to the voltages of the first and second storage electrode lines SLa and SLb, then the voltages of the first, second, and third subpixel electrodes 191*a*, 191*b*, and 191*c* are changed.

In detail, the voltage Pa of the first subpixel electrode is increased by the value ΔPa according to the change of the first storage electrode signal Vsta.

The influences of the first storage electrode signal Vsta and the second storage electrode signal Vstb are offset such that the second subpixel electrode voltage Pb is maintained.

The third subpixel electrode 191*c* is decreased by the value APc according to the change of the second storage electrode signal Vstb.

Accordingly, with reference to the common voltage Vcom, the voltage of the first subpixel electrode 191*a* becomes Vpa1, the voltage of the second subpixel electrode 191*b* becomes Vpb1, and the voltage of the third subpixel electrode 191*c* becomes Vpc1, and the order of the magnitude thereof is Vpa1>Vpb1>Vpc1. These subpixel electrode voltages Vpa1, Vpb1, and Vpc1 are maintained during one frame.

Next, the polarity of the voltage applied to each subpixel electrode 191*a*, 191*b*, and 191*c* is reversed in the next frame and the procedure of the previous frame is repeated, the voltage of the first subpixel electrode 191*a* becomes Vpa2, the voltage of the second subpixel electrode 191*b* becomes Vpb2, and the voltage of the third subpixel electrode 191*c* becomes Vpc2, and the order of the magnitude thereof is Vpa2>Vpb2>Vpc2.

Next, the effects of the liquid crystal displays according to the various exemplary embodiment of the present invention will be described with reference to FIG. 12A, FIG. 12B, FIG. 12C, and FIG. 12D.

Figure 12A:
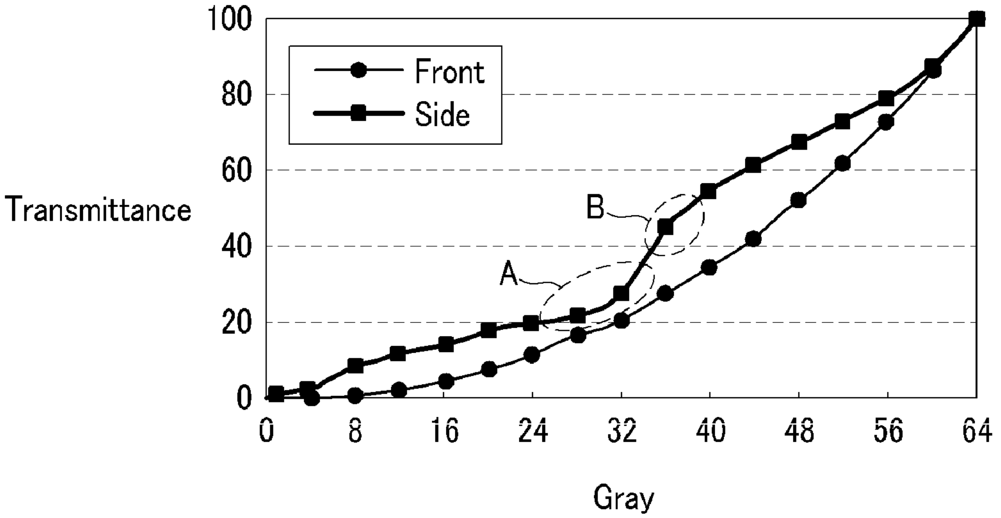
FIG. 12A is a graph showing gamma curves of the front and the side of the liquid crystal display according to the conventional art.
Figure 12B:
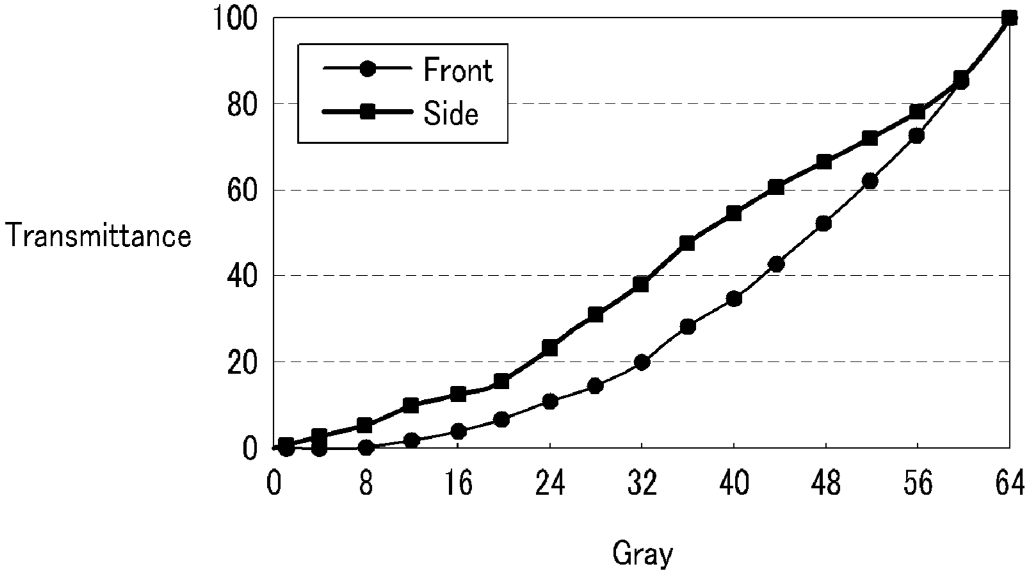
FIG. 12B, FIG. 12C, and FIG. 12D are graphs showing gamma curves of the front and the side of the liquid crystal display according to various exemplary embodiments of the present invention.
Figure 12C:
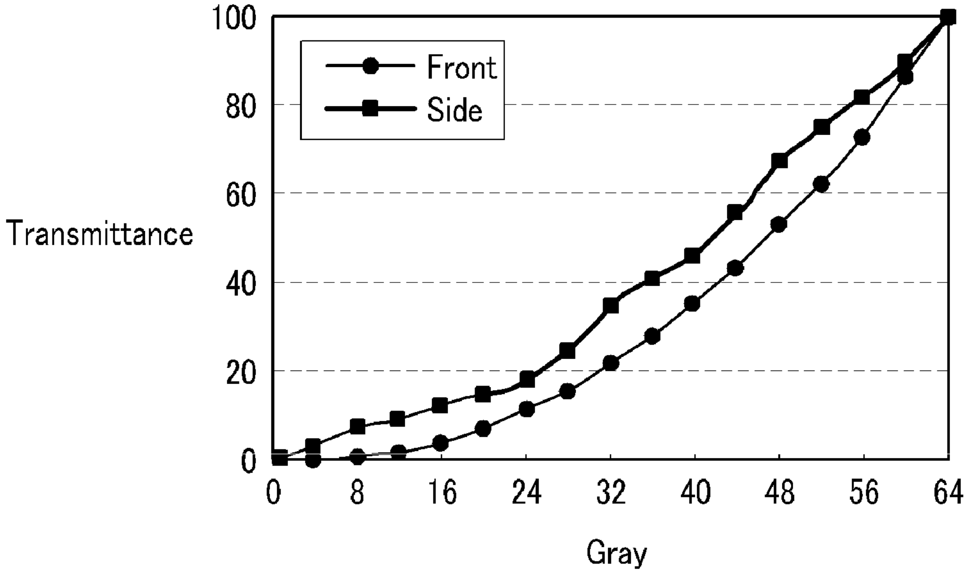
Figure 12D:
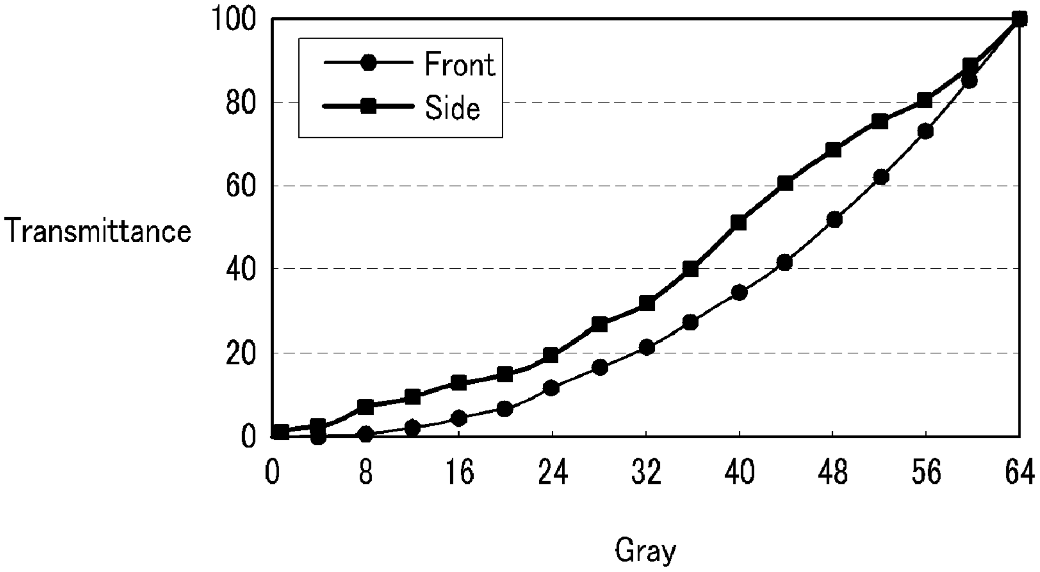

FIG. 12A is a graph showing gamma curves of the front and the side of the liquid crystal display according to the conventional art, and FIG. 12B, FIG. 12C, and FIG. 12D are graphs showing gamma curves of the front and the side of the liquid crystal display according to various exemplary embodiments of the present invention.

FIG. 12A shows a case of the liquid crystal display including a pixel electrode that is divided into two subpixel electrodes that are spaced apart from each other, and FIG. 12B, FIG. 12C, and FIG. 12D show cases of the liquid crystal display including a pixel electrode that is divided into three subpixel electrodes that are spaced apart from each other. FIG. 12B shows the case in which the area ratio of the first, second, and third subpixel electrodes 191*a*, 191*b*, and 191*c* is 1:2:1, the capacitance ratio of the first storage capacitor Csta to the first liquid crystal capacitor Clca is 1, and the capacitance ratio of the second storage capacitor Cstb to the second liquid crystal capacitor Clcb is 0.2 in the liquid crystal panel assembly of FIG. 3. FIG. 12C shows the case in which the area ratio of the first, second, and third subpixel electrodes 191*a*, 191*b*, and 191*c* is 1.5:1.5:1, the capacitance ratio of the first storage capacitor Csta to the first liquid crystal capacitor Clca is 0.65, and the capacitance ratio of the third storage capacitor Cstc to the third liquid crystal capacitor Clcc is 0.65 in the liquid crystal panel assembly of FIG. 9. FIG. 12D shows the case in which the area ratio of the first, second, and third subpixel electrodes 191*a*, 191*b*, and 191*c* is 1:2:1, the capacitance ratio of the first storage capacitor Csta to the first liquid crystal capacitor Clca is 0.8, and the capacitance ratio of the third storage capacitor Cstc to the third liquid crystal capacitor Clcc is 0.65 in the liquid crystal panel assembly of FIG. 9.

The index of visibility is 0.250 in the case of FIG. 12A, which may be better than the index of visibility of the general case in which the pixel electrode is not divided. Here, the index of visibility is the index in which the distortion amount of the side gamma for the front gamma is quantified. However, a turning point at which the gamma curve is rapidly changed is generated in portion A of the side gamma curve, and the curved line is swollen in portion B. Like this, when the side gamma curve is not smoothly changed, the change of the color or the luminance is not natural in the side of the liquid crystal display and the phenomenon in which the color or the luminance is rapidly changed is generated such that the screen is unpleasantly shown.

This phenomenon is generated since the corresponding liquid crystal molecules are suddenly moved, when the subpixel having a relatively low voltage among two subpixels starts to contribute to the entire voltage over the some gray.

On the other hand, the indexes of visibility were respectively 0.224, 0.204, and 0.204 in the cases of FIG. 12B, FIG. 12C, and FIG. 12D. Also, the generation of the phenomena of a turning point and swelling may be prevented in the side gamma curve in the respective cases, and the side gamma curve may be comparably smooth. In the liquid crystal display according to the present invention, the entire pixel is divided into three subpixels having different voltages from each other such that the subpixel having the relatively low voltage may be divided into two. Accordingly, when the subpixel having the relatively low voltage among is two subpixels starts to contribute to the entire voltage over the some gray, even though the corresponding liquid crystal molecules may suddenly move, because the corresponding portion is divided in two, the influence may be reduced such that the side gamma curve may be smooth.

Accordingly, to prevent the phenomena of a turning point and swelling of the side gamma curve and to obtain a sufficient index of visibility, in relation to the common voltage Vcom, the first subpixel electrode voltage Vpa1 may be higher than the third subpixel electrode voltage Vpc1 by 0.5 V to 1.5 V, and the second subpixel electrode voltage Vpb1 may be higher than the third subpixel electrode voltage Vpc1 by 0.1 V to 1.0 V in the case of the liquid crystal display of FIG. 3. In the case of the liquid crystal display of FIG. 9, in relation to the common voltage Vcom, the first subpixel electrode voltage Vpa1 is higher than the second subpixel electrode voltage Vpb1 by 0.5 V to 1.5 V, and the third subpixel electrode voltage Vpc1 is less than the second subpixel electrode voltage Vpb1 by 0.5 V to 1.5 V.

According to exemplary embodiments of the present invention, the improved index of visibility may be maintained and the screen deterioration generated at the side of the liquid crystal display may be minimized, as compared with the case in which the pixel electrode is divided into two.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A display panel, comprising:

a pixel electrode comprising a first subpixel electrode, a second subpixel electrode, and a third subpixel electrode insulated from each other;

a first thin film transistor connected to the first subpixel electrode;

a second thin film transistor connected to the second subpixel electrode;

a third thin film transistor connected to the third subpixel electrode;

a gate line connected to the first thin film transistor, the second thin film transistor, and the third thin film transistor;

a data line connected to the first thin film transistor, the second thin film transistor, and the third thin film transistor; and a voltage differentiating member configured to change respective voltages of the first subpixel electrode, the second subpixel electrode, and the third subpixel electrode to be different from each other, wherein the first subpixel electrode, the second subpixel electrode, and the third subpixel electrode are configured to simultaneously receive a same voltage through the first thin film transistor, the second thin film transistor, and the third thin film transistor, respectively.

2. The display panel of claim 1, wherein the voltage differentiating member comprises a first storage electrode line and a second storage electrode line.

3. The display panel of claim 2, wherein the first storage electrode line and the second storage electrode line are parallel to each other.

4. The display panel of claim 2, wherein the first storage electrode line and the second storage electrode line are substantially parallel to the gate line.

5. The display panel of claim 2, wherein the first storage electrode line overlaps at least one of the first subpixel electrode, the second subpixel electrode, and the third subpixel electrode, and the second storage electrode line overlaps at least one of first subpixel electrode, the second subpixel electrode, and the third subpixel electrode.

6. The display panel of claim 2, wherein the first storage electrode line crosses one of the first subpixel electrode, the second subpixel electrode, and the third subpixel electrode, and the second storage electrode line crosses one of the second subpixel electrode and the third subpixel electrode.

7. The display panel of claim 2, wherein the first storage electrode line and the second storage electrode line are respectively configured to receive a first storage voltage and a second storage voltage having opposite phases from each other.

8. The display panel of claim 2, wherein at least one of the first storage electrode line and the second storage electrode line comprises at least one branch extending parallel to the data line.

9. The display panel of claim 2, wherein at least one of the first storage electrode line and the second storage electrode line comprises a plurality of storage electrodes.

10. The display panel of claim 9, wherein each of the first subpixel electrode, the second subpixel electrode, and the third subpixel electrode overlaps two storage electrodes of the plurality of storage electrodes.

11. The display panel of claim 1, wherein the voltage differentiating member is further configured to increase at least one of the voltages of the first subpixel electrode, the second subpixel electrode, and the third subpixel electrode.

12. The display panel of claim 11, wherein the voltage differentiating member is further configured to decrease at least one of the voltages of the first subpixel electrode, the second subpixel electrode, and the third subpixel electrode.

13. The display panel of claim 1, wherein the voltage differentiating member is further configured to decrease at least one of the voltages of the first subpixel electrode, the second subpixel electrode, and the third subpixel electrode.

14. The display panel of claim 13, wherein the voltage differentiating member is further configured to increase at least one of the voltages of the first subpixel electrode, the second subpixel electrode, and the third subpixel electrode.

15. The display panel of claim 1, wherein the voltage differentiating member is further configured to maintain at least one of the voltages of the first subpixel electrode, the second subpixel electrode, and the third subpixel electrode.

16. The display panel of claim 15, wherein the voltage differentiating member is further configured to increase at least one of the voltages of the first subpixel electrode, the second subpixel electrode, and the third subpixel electrode.

17. The display panel of claim 16, wherein the voltage differentiating member is further configured to decrease at least one of the voltages of the first subpixel electrode, the second subpixel electrode, and the third subpixel electrode.

18. The display panel of claim 1, wherein the voltage differentiating member is disposed in a same layer as the gate line.

19. The display panel of claim 1, wherein the voltage differentiating member is connected to the first subpixel electrode, the second subpixel electrode, and the third subpixel electrode via respective capacitors.

20. The display panel of claim 1, wherein the voltage differentiating member crosses at least one of the first subpixel electrode, the second subpixel electrode, and the third subpixel electrode.

21. The display panel of claim 1, wherein at least one of the first subpixel electrode, the second subpixel electrode, and the third subpixel electrode comprises a different area from at least one of the remaining subpixel electrodes.

22. The display panel of claim 21, wherein the voltage differentiating member comprises at least one storage electrode line, and a subpixel electrode having a minimum area among the first subpixel electrode, the second subpixel electrode, and the third subpixel electrode overlaps a storage electrode of the at least one storage electrode lines.

23. The display panel of claim 1, wherein each of the first subpixel electrode, the second subpixel electrode, and the third subpixel electrode comprises a rectangular shape.

24. The display panel of claim 1, wherein each of the first subpixel electrode, the second subpixel electrode, and the third subpixel electrode comprises at least one cutout.

25. A display panel, comprising:

a pixel electrode comprising a first subpixel electrode, a second subpixel electrode, and a third subpixel electrode insulated from each other;

a first thin film transistor connected to the first subpixel electrode;

a second thin film transistor connected to the second subpixel electrode;

a third thin film transistor connected to the third subpixel electrode;

a gate line connected to the first thin film transistor, the second thin film transistor, and the third thin film transistor;

a data line connected to the first thin film transistor, the second thin film transistor, and the third thin film transistor; and a voltage differentiating member connected to each of the first subpixel electrode, the second subpixel electrode, and the third subpixel electrode.

26. The display panel of claim 25, wherein the voltage differentiating member is configured to change respective voltages of the first subpixel electrode, the second subpixel electrode, and the third subpixel electrode to be different from each other.

27. The display panel of claim 25, wherein the voltage differentiating member comprises a first storage electrode line and a second storage electrode line.

28. The display panel of claim 27, wherein the first storage electrode line and the second storage electrode line are parallel to each other.

29. The display panel of claim 27, wherein the first storage electrode line and the second storage electrode line are substantially parallel to the gate line.

30. The display panel of claim 27, wherein the first storage electrode line overlaps at least one of the first subpixel electrode, the second subpixel electrode, and the third subpixel electrode, and the second storage electrode line overlaps at least one of the first subpixel electrode, the second subpixel electrode, and the third subpixel electrode.

31. The display panel of claim 27, wherein the first storage electrode line crosses one of the first subpixel electrode, the second subpixel electrode, and the third subpixel electrode, and the second storage electrode line crosses one of the second subpixel electrode and the third subpixel electrode.

32. The display panel of claim 27, wherein the first storage electrode line and the second storage electrode line are respectively configured to receive a first storage voltage and a second storage voltage having opposite phases from each other.

33. The display panel of claim 27, wherein at least one of the first storage electrode line and the second storage electrode line comprises at least one branch extending parallel to the data line.

34. The display panel of claim 27, wherein at least one of the first storage electrode line and the second storage electrode line comprises a plurality of storage electrodes.

35. The display panel of claim 34, wherein each of the first subpixel electrode, the second subpixel electrode, and the third subpixel electrode overlaps two storage electrodes of the plurality of storage electrodes.

36. The display panel of claim 25, wherein the voltage differentiating member is configured to increase at least one of the voltages of the first subpixel electrode, the second subpixel electrode, and the third subpixel electrode.

37. The display panel of claim 36, wherein the voltage differentiating member is further configured to decrease at least one of the voltages of the first subpixel electrode, the second subpixel electrode, and the third subpixel electrode.

38. The display panel of claim 25, wherein the voltage differentiating member is configured to decrease at least one of the voltages of the first subpixel electrode, the second subpixel electrode, and the third subpixel electrode.

39. The display panel of claim 38, wherein the voltage differentiating member is further configured to increase at least one of the voltages of the first subpixel electrode, the second subpixel electrode, and the third subpixel electrode.

40. The display panel of claim 25, wherein the voltage differentiating member is configured to maintain at least one of voltages of the first subpixel electrode, the second subpixel electrode, and the third subpixel electrode.

41. The display panel of claim 40, wherein the voltage differentiating member is further configured to increase at least one of the voltages of the first subpixel electrode, the second subpixel electrode, and the third subpixel electrode.

42. The display panel of claim 41, wherein the voltage differentiating member is further configured to decrease at least one of the voltages of the first subpixel electrode, the second subpixel electrode, and the third subpixel electrode.

43. The display panel of claim 25, wherein the voltage differentiating member is disposed in a same layer as the gate line.

44. The display panel of claim 25, wherein the voltage differentiating member is connected to the first subpixel electrode, the second subpixel electrode, and the third subpixel electrode via respective capacitors.

45. The display panel of claim 25, wherein the voltage differentiating member crosses at least one of the first subpixel electrode, the second subpixel electrode, and the third subpixel electrode.

46. The display panel of claim 25, wherein at least one of the first subpixel electrode, the second subpixel electrode, and the third subpixel electrode comprises a different area from at least one of the remaining subpixel electrodes.

47. The display panel of claim 46, wherein the voltage differentiating member comprises at least one storage electrode line, and a subpixel electrode having a minimum area among the first subpixel electrode, the second subpixel electrode, and the third subpixel electrode overlaps a storage electrode of the at least one storage electrode lines.

48. The display panel of claim 25, wherein each of the first subpixel electrode, the second subpixel electrode, and the third subpixel electrode comprises a rectangular shape.

49. The display panel of claim 25, wherein each of the first subpixel electrode, the second subpixel electrode, and the third subpixel electrode comprises at least one cutout.

50. A display panel, comprising:

a pixel electrode comprising a first subpixel electrode, a second subpixel electrode, and a third subpixel electrode insulated from each other;

a first thin film transistor connected to the first subpixel electrode;

a second thin film transistor connected to the second subpixel electrode;

a third thin film transistor connected to the third subpixel electrode;

a gate line connected to the first thin film transistor, the second thin film transistor, and the third thin film transistor;

a data line connected to the first thin film transistor, the second thin film transistor, and the third thin film transistor; and a voltage differentiating member connected to each of the first subpixel electrode, the second subpixel electrode, and the third subpixel electrode, wherein the voltage differentiating member is configured to maintain at least one of the voltages of the first subpixel electrode, the second subpixel electrode, and the third subpixel electrode.

51. The display panel of claim 50, wherein the voltage differentiating member is configured to change respective voltages of the first subpixel electrode, the second subpixel electrode, and the third subpixel electrode to be different from each other.

52. The display panel of claim 50, wherein the voltage differentiating member comprises a first storage electrode line and a second storage electrode line.

53. The display panel of claim 52, wherein the first storage electrode line and the second storage electrode line are parallel to each other.

54. The display panel of claim 52, wherein the first storage electrode line and the second storage electrode line are substantially parallel to the gate line.

55. The display panel of claim 52, wherein the first storage electrode line overlaps at least one of the first subpixel electrode, the second subpixel electrode, and the third subpixel electrode, and the second storage electrode line overlaps at least one of the first subpixel electrode, the second subpixel electrode, and the third subpixel electrode.

56. The display panel of claim 52, wherein the first storage electrode line crosses one of the first subpixel electrode, the second subpixel electrode, and the third subpixel electrode, and the second storage electrode line crosses one of the second subpixel electrode and the third subpixel electrode.

57. The display panel of claim 52, wherein the first storage electrode line and the second storage electrode line are respectively configured to receive a first storage voltage and a second storage voltage having opposite phases from each other.

58. The display panel of claim 52, wherein at least one of the first storage electrode line and the second storage electrode line comprises at least one branch extending parallel to the data line.

59. The display panel of claim 52, wherein at least one of the first storage electrode line and the second storage electrode line comprises a plurality of storage electrodes.

60. The display panel of claim 59, wherein each of the first subpixel electrode, the second subpixel electrode, and the third subpixel electrode overlaps two storage electrodes of the plurality of storage electrodes.

61. The display panel of claim 50, wherein the voltage differentiating member is further configured to increase at least one of the voltages of the first subpixel electrode, the second subpixel electrode, and the third subpixel electrode.

62. The display panel of claim 61, wherein the voltage differentiating member is further configured to decrease at least one of the voltages of the first subpixel electrode, the second subpixel electrode, and the third subpixel electrode.

63. The display panel of claim 50, wherein the voltage differentiating member is further configured to decrease at least one of the voltages of the first subpixel electrode, the second subpixel electrode, and the third subpixel electrode.

64. The display panel of claim 63, wherein the voltage differentiating member is further configured to increase at least one of the voltages of the first subpixel electrode, the second subpixel electrode, and the third subpixel electrode.

65. The display panel of claim 50, wherein the voltage differentiating member is disposed in a same layer as the gate line.

66. The display panel of claim 50, wherein the voltage differentiating member is connected to the first subpixel electrode, the second subpixel electrode, and the third subpixel electrode via respective capacitors.

67. The display panel of claim 50, wherein the voltage differentiating member crosses at least one of the first subpixel electrode, the second subpixel electrode, and the third subpixel electrode.

68. The display panel of claim 50, wherein at least one of the first subpixel electrode, the second subpixel electrode, and the third subpixel electrode comprises a different area from at least one of the remaining subpixel electrodes.

69. The display panel of claim 68, wherein the voltage differentiating member comprises at least one storage electrode line, and a subpixel electrode having a minimum area among the first subpixel electrode, the second subpixel electrode, and the third subpixel electrode overlaps a storage electrode of the at least one storage electrode lines.

70. The display panel of claim 50, wherein each of the first subpixel electrode, the second subpixel electrode, and the third subpixel electrode comprises a rectangular shape.

71. The display panel of claim 50, wherein each of the first subpixel electrode, the second subpixel electrode, and the third subpixel electrode comprises at least one cutout.

* * * * *